United States Patent
Frackelton et al.

(10) Patent No.: US 11,047,761 B1
(45) Date of Patent: Jun. 29, 2021

(54) INTEGRATED LEAK DETECTION

(71) Applicant: Moen Incorporated, North Olmsted, OH (US)

(72) Inventors: Brian Patrick Frackelton, Macedonia, OH (US); Harshil R. Parikh, North Olmsted, OH (US); Daniel W. Baker, Medina, OH (US)

(73) Assignee: Moen Incorporated, North Olmsted, OH (US)

( * ) Notice: Subject to any disclaimer, the term of this patent is extended or adjusted under 35 U.S.C. 154(b) by 192 days.

(21) Appl. No.: 16/270,690

(22) Filed: Feb. 8, 2019

Related U.S. Application Data

(60) Provisional application No. 62/627,840, filed on Feb. 8, 2018.

(51) Int. Cl.
*G01M 3/04* (2006.01)
*G01M 3/18* (2006.01)
(Continued)

(52) U.S. Cl.
CPC ............ *G01M 3/04* (2013.01); *G01M 3/18* (2013.01); *G01M 3/243* (2013.01); *E03B 7/071* (2013.01)

(58) Field of Classification Search
CPC .......... G01M 3/04; G01M 3/18; G01M 3/243; G01M 3/28; F17D 5/05; F17D 5/06; E03B 7/071
See application file for complete search history.

(56) References Cited

U.S. PATENT DOCUMENTS

| 5,460,196 A | 10/1995 | Yonnet |
| 5,636,653 A | 6/1997 | Titus |

(Continued)

FOREIGN PATENT DOCUMENTS

| AU | 2016353089 A1 | 5/2018 |
| CA | 3004832 A1 | 5/2017 |

(Continued)

OTHER PUBLICATIONS

Search Report and Written Opinion for International Application No. PCT/US20/18047 dated Jun. 25, 2020.

*Primary Examiner* — Natalie Huls
(74) *Attorney, Agent, or Firm* — Calfee, Halter & Griswold LLP

(57) ABSTRACT

Exemplary systems comprise a leak detection module with a processor that processes signals from a plurality of low cost sensors installed multiple locations throughout a fluid system, e.g., throughout a house, to determine the presence of a leak in the fluid system. An exemplary electronic plumbing fixture fitting comprises a fixture body including a discharge outlet, the discharge outlet being operable to deliver water via a fluid path; an electronically controlled valve in fluid communication with the fixture body in the fluid path upstream of the discharge outlet; at least one processor programmed to control the electronically controlled valve to selectively control a flow of fluid from the electronically controlled valve out the discharge outlet of the fixture body; and a local water sensor in electrical or optical communication with the processor, operably connected to the fixture body, and positioned to generate a local leak sensing signal having local sensed leak data imposed thereon, the local sensed leak data indicating a leak in the fluid path; and wherein the at least one processor has code causing the at least one processor to determine the presence of leaks in the fluid path using at least the local sensed leak (Continued)

data; and wherein the at least one processor has code causing the at least one processor to, in response to determining the presence of a leak in the fluid path using at least the local sensed leak data, perform any one of or both of the following: transmit to another processor, using communications circuitry, data indicating the presence of the detected leak in the fluid path; and automatically adjust the electronically controlled valve to adjust the flow of water flowing through the electronically controlled valve.

19 Claims, 18 Drawing Sheets

(51) Int. Cl.
*G01M 3/24* (2006.01)
*E03B 7/07* (2006.01)

(56) References Cited

U.S. PATENT DOCUMENTS

| | | | |
|---|---|---|---|
| 5,992,218 A * | 11/1999 | Tryba | G01M 3/16 73/40.5 R |
| 6,186,162 B1 | 2/2001 | Purvis et al. | |
| 6,237,618 B1 | 5/2001 | Kushner | |
| 6,532,979 B1 | 3/2003 | Richter | |
| 6,655,413 B2 | 12/2003 | Condon et al. | |
| 6,773,135 B1 | 8/2004 | Packer | |
| 6,792,967 B1 * | 9/2004 | Franklin | F16K 17/042 122/504 |
| 7,147,204 B2 | 12/2006 | Hollingsworth et al. | |
| 7,308,824 B2 | 12/2007 | Trescott, Jr. et al. | |
| 7,549,435 B2 * | 6/2009 | Walter | F17D 5/06 137/15.11 |
| 8,210,029 B2 | 7/2012 | Hart et al. | |
| 8,347,427 B2 | 1/2013 | Klicpera | |
| 8,402,984 B1 | 3/2013 | Ziegenbein et al. | |
| 8,439,062 B1 | 5/2013 | Ziegenbein et al. | |
| 8,489,342 B2 | 7/2013 | Dugger et al. | |
| 8,776,824 B2 * | 7/2014 | Yao | E03B 7/071 137/312 |
| 8,887,324 B2 | 11/2014 | Kilcpera | |
| 8,887,768 B2 | 11/2014 | Hart et al. | |
| 8,893,320 B2 | 11/2014 | Kilcpera | |
| 9,061,307 B2 | 6/2015 | Klicpera et al. | |
| 9,110,848 B1 | 8/2015 | Kim | |
| 9,111,221 B1 | 8/2015 | Kelly et al. | |
| 9,139,986 B2 | 9/2015 | Smith et al. | |
| 9,142,118 B2 | 9/2015 | Patenaude et al. | |
| 9,146,172 B2 | 9/2015 | Trescott | |
| 9,224,277 B1 | 12/2015 | Kelly et al. | |
| 9,254,499 B2 | 2/2016 | Klicpera | |
| 9,266,136 B2 | 2/2016 | Klicpera | |
| 9,297,150 B2 | 3/2016 | Klicpera | |
| 9,348,689 B2 | 5/2016 | Kim | |
| 9,371,632 B2 | 6/2016 | Trescott | |
| 9,410,833 B1 | 8/2016 | Leaders et al. | |
| 9,432,763 B2 * | 8/2016 | Scharf | G01M 3/16 |
| 9,494,480 B2 | 11/2016 | Klicpera | |
| 9,508,233 B2 | 11/2016 | Kelly et al. | |
| 9,534,978 B2 | 1/2017 | Trescott et al. | |
| 9,714,501 B2 | 7/2017 | Keiter et al. | |
| 9,749,792 B2 | 8/2017 | Klicpera | |
| 9,752,952 B2 * | 9/2017 | Poon | G01M 3/16 |
| 9,759,632 B2 | 9/2017 | Trescott et al. | |
| 9,857,805 B2 | 1/2018 | Halimi | |
| 9,874,466 B2 | 1/2018 | Leaders et al. | |
| 9,928,724 B2 * | 3/2018 | Alcorn | G01F 15/06 |
| 9,964,461 B2 | 5/2018 | Hart et al. | |
| 10,036,143 B2 | 7/2018 | Trescott et al. | |
| 10,094,095 B2 | 10/2018 | Enev et al. | |
| 10,428,495 B2 | 10/2019 | Halimi | |
| 10,458,872 B2 | 10/2019 | Halimi | |
| 10,648,842 B2 * | 5/2020 | Croteau | G01F 25/0007 |
| 2002/0033759 A1 * | 3/2002 | Morello | G01M 3/18 340/605 |
| 2006/0137090 A1 * | 6/2006 | Jeffries | G01M 3/2807 4/664 |
| 2007/0095400 A1 * | 5/2007 | Bergquist | F16K 31/06 137/485 |
| 2007/0289635 A1 * | 12/2007 | Ghazarian | F17D 5/06 137/312 |
| 2009/0049599 A1 * | 2/2009 | Parsons | E03D 5/105 4/623 |
| 2009/0066524 A1 * | 3/2009 | Yukawa | G01M 3/2815 340/605 |
| 2009/0140866 A1 * | 6/2009 | Heilmann | G01M 3/186 340/605 |
| 2010/0313958 A1 | 12/2010 | Patel et al. | |
| 2010/0315245 A1 * | 12/2010 | Wofford | G08B 21/20 340/605 |
| 2012/0255342 A1 * | 10/2012 | Ahdout | G01M 3/184 73/40.5 R |
| 2014/0069207 A1 | 3/2014 | Leaders et al. | |
| 2014/0097367 A1 | 4/2014 | Burt | |
| 2015/0376874 A1 * | 12/2015 | Breedlove | E03B 7/003 137/2 |
| 2016/0123834 A1 | 5/2016 | Vilbrandt et al. | |
| 2016/0161310 A1 | 6/2016 | Leaders et al. | |
| 2016/0163177 A1 | 6/2016 | Klicpera | |
| 2016/0284193 A1 * | 9/2016 | Davis | G01M 3/18 |
| 2016/0298317 A1 | 10/2016 | Trescott | |
| 2016/0334255 A1 | 11/2016 | Gestner | |
| 2016/0348802 A1 | 12/2016 | Halimi et al. | |
| 2016/0370249 A1 | 12/2016 | Hart et al. | |
| 2016/0378322 A1 | 12/2016 | Klicpera | |
| 2017/0030528 A1 * | 2/2017 | Dietzen | G08B 21/20 |
| 2017/0131174 A1 * | 5/2017 | Enev | E03B 7/071 |
| 2017/0159267 A1 | 6/2017 | Halimi | |
| 2017/0292893 A1 * | 10/2017 | Bunker | G01M 3/26 |
| 2017/0298597 A1 | 10/2017 | Hammond et al. | |
| 2017/0322567 A1 | 11/2017 | Klein et al. | |
| 2018/0042189 A1 | 2/2018 | Klein et al. | |
| 2018/0112376 A1 | 4/2018 | Beger et al. | |
| 2018/0127957 A1 | 5/2018 | Enev et al. | |
| 2018/0136673 A1 | 5/2018 | Halimi | |
| 2018/0164136 A1 | 6/2018 | Gestner | |
| 2018/0182228 A1 | 6/2018 | Alcorn et al. | |
| 2018/0259982 A1 | 9/2018 | Halimi | |
| 2019/0025150 A1 * | 1/2019 | Picardi | G01F 15/005 |
| 2019/0154539 A1 | 5/2019 | Banerjee et al. | |
| 2019/0377369 A1 * | 12/2019 | Evans | F17D 5/06 |
| 2020/0057457 A1 | 2/2020 | Halimi et al. | |
| 2020/0209097 A1 * | 7/2020 | Evans | G01M 3/28 |
| 2020/0264068 A1 * | 8/2020 | Mess | G01M 3/2815 |

FOREIGN PATENT DOCUMENTS

| | | |
|---|---|---|
| EP | 1172779 A3 | 2/2003 |
| EP | 3180594 A1 | 6/2017 |
| EP | 3155381 A4 | 3/2018 |
| WO | 2009103729 A1 | 8/2009 |
| WO | 2017083547 A1 | 11/2016 |
| WO | 2017112480 A1 | 6/2017 |
| WO | 2018076203 A1 | 5/2018 |
| WO | 2018085636 A1 | 5/2018 |
| WO | 2018091143 A1 | 5/2018 |

* cited by examiner

New Connect Faucet Architecture
(voice in kitchen platform valve)

New Connect Faucet Architecture
(voice in kitchen platform valve)

Leak Detection Accessories

Benefit of Low Cost Wired Leak Detection Sensors at Fixture Locations

Benefit of Low Cost Wired Leak Detection Sensors at Fixture Locations

[Intentionally left Blank]

Example of known event patterns

| | |
|---|---|
| Time Delay | Delay between sensors, time for pressure wave to settle, etc. |
| Amplitude | Peak to Peak, minimum, maxium, attenuation between sensors, etc. |
| Freq f(x) | Dominant frequency, binned frequency spectrum, min/max, etc. |
| Pattern Type? | Leak, Shower, Sink, Toilet, etc. |

INTEGRATED LEAK DETECTION

CROSS-REFERENCE TO RELATED APPLICATIONS

This application claims priority to, and any other benefit of, U.S. Provisional Pat. App. Ser. No. 62/627,840, filed Feb. 8, 2018, the entire contents of which are hereby incorporated herein by reference in its entirety.

BACKGROUND

The present application discloses plumbing systems and methods, and particularly systems and methods for detecting leaks in a plumbing system. More specifically, exemplary systems comprise a leak detection module with a processor that processes signals from a plurality of low cost and/or hardwired sensors installed at multiple locations throughout a fluid system and/or building to determine the presence of a leak in the fluid system.

Current leak detection systems are limited to expensive pressure, flow and temperature sensors installed at a single point, typically at the point the main utility line enters the building.

SUMMARY

The present application discloses various leak detection systems, methods, and sensors.

An exemplary system comprises: A system for detecting leaks in a plumbing system comprising: a plurality of sensor devices, each located at a different location within the plumbing system, each sensor device having a pressure sensor, a local processor; a clock; and a wireless transceiver; a memory for storing pressure sensor data; and a central processor configured to analyze aggregate pressure sensor data from the plurality of sensor devices and to determine the presence of a leak in the plumbing system based on the aggregate pressure sensor data.

DETAILED DESCRIPTION

This Detailed Description merely describes exemplary embodiments of the invention and is not intended to limit the scope of the claims in any way. Indeed, the invention as claimed is broader than and unlimited by the preferred embodiments, and the terms used in the claims have their full ordinary meaning.

As disclosed herein, leaks in an exemplary plumbing system are detected by low-cost pressure sensors located at fixtures throughout the plumbing system. The sensors provide data to a central processor that uses pattern recognition or other algorithms to compare the pressure data to stored data to determine whether a leak is present in the plumbing system. By aggregating data from a plurality of sensors, the system can utilize lower cost and lower resolution pressure sensors. The effectiveness of the systems increases, and even eclipses the performance of present single-sensor systems, as more low-cost sensors are added. Consumers are also incentivized to use the system because they need only purchase and install kitchen, bath, shower, or other fixtures as they normally would. The end consumer can slowly ease into leak detection and slowly expand capabilities in their building by upgrading additional fixtures or buying additional accessories at their discretion and on their preferred timeline.

Figure 1:
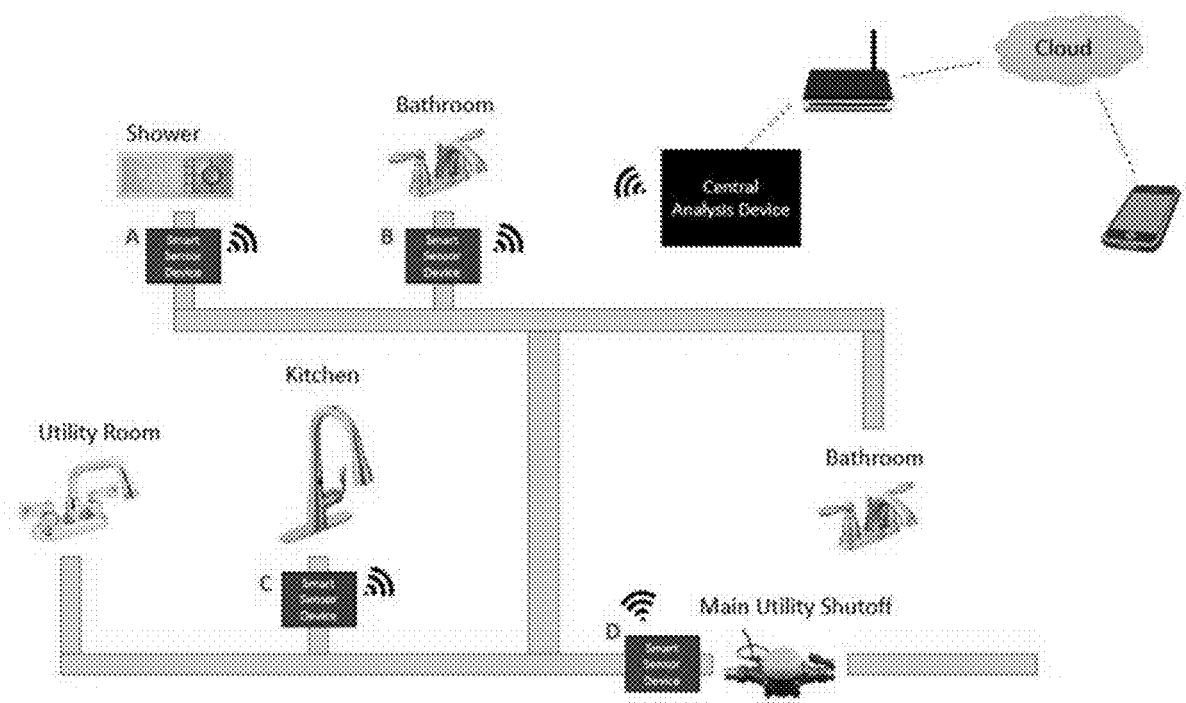
FIG. 1 is a schematic diagram of an exemplary leak detection system.

An exemplary embodiment of a leak detection system is depicted in FIG. 1. A plumbing system includes a number of fixtures that feed from a main utility line. A leak detection system for the plumbing system includes a plurality of "smart sensor devices" installed near some of the fixtures, and a central analysis device. In some embodiments, the system also includes a smart sensor device installed at the main utility input.

Figure 2:
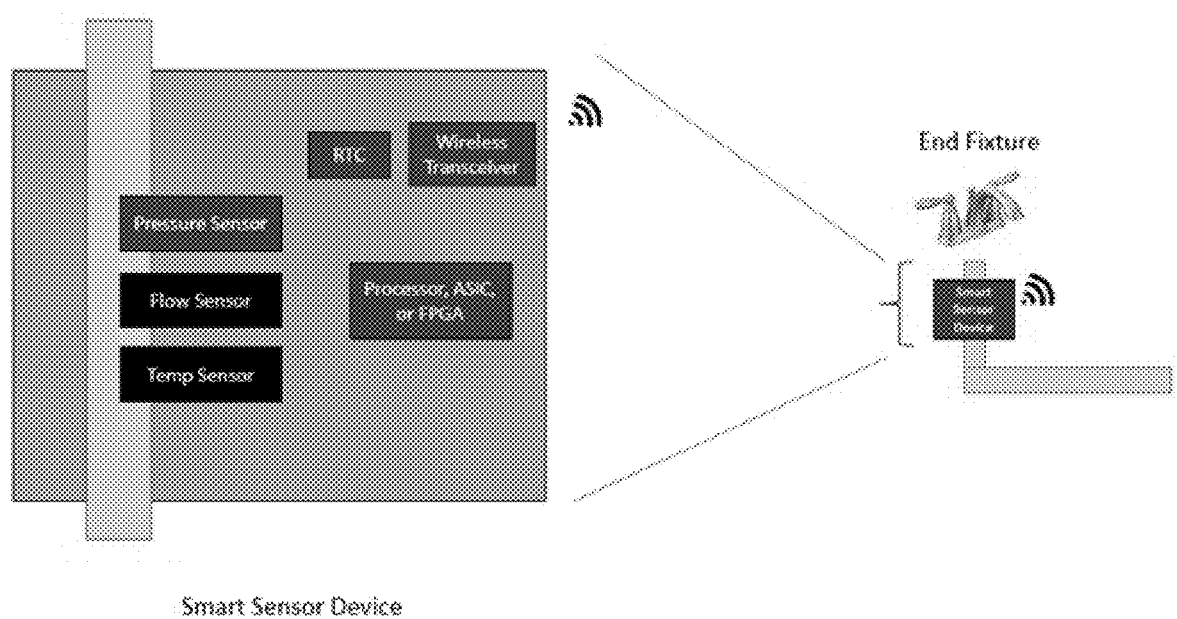
FIGS. 2-3 are schematic diagrams of exemplary smart sensor devices.

FIG. 2 depicts an exemplary smart sensor device. The smart sensor device includes at least a pressure sensor to monitor pressure of the water line, a processor to collect sensor data and prepare it for transmission, a clock to timestamp sensor data, and a wireless or wired transceiver to transmit the data to a central analysis device. In some exemplary embodiments, the smart sensor device does not have a valve for controlling flow of water. In some exemplary embodiments, the smart sensor device does not have a valve for controlling flow of water and, instead, the smart sensor device has circuitry to control a separate valve, such as a main shutoff valve or some other valve in the water fluid path, and a processor with code causing the smart sensor device to control the separate valve as discussed herein, e.g., when a leak is detected.

One benefit of the present system and method is the ability to obtain high-accuracy leak detection using low-cost sensors. There are many ways to implement low-cost sensors in the present system and method, and it is contemplated that the system and method can utilize one or many different types of sensor implementations, which are described in detail further below and in FIGS. 16-25. For example, in one embodiment the low-cost sensor can simply be a standard water pressure sensor with lower resolution (e.g., 8-bit), where a plurality of such sensors working together as described herein is able to achieve high-accuracy leak detection where a single such sensor could not.

"Computer" or "processor" as used in a smart sensor device and elsewhere herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), reduced instruction set computing (RISC) processors, digital signal processors (DSPs), field programmable gate arrays (FPGAs), etc. Computer devices herein can have any of various configurations, such as handheld computers (e.g., so-called smart phones), pad computers, tablet laptop computers, desktop computers, and other configurations, and including other form factors. The various computers and processors herein have logic for performing the various corresponding functions and processes described herein. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like. In exemplary embodiments, some or all of the software is stored on memory, which includes one or more non-transitory computer readable media of one or more local or remote data storage devices. As used herein, "data storage device" means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., RAM, ROM, PROM, EPROM, EEPROM, flash PROM, external flash memory drives, etc. Communication circuits herein include antennas and/or data ports and driver chips for sending and receiving communications with other devices. In exemplary embodiment, communication circuits can include any one or more of Wi-Fi antennas and circuitry, LTE antennas and circuitry, GPS antennas and circuitry, CDPD antennas and circuitry, GPRS antennas and circuitry, GSM antennas and circuitry, UMTS antennas and circuitry, Ethernet circuitry, and other antennas and circuitry, USB ports and circuitry (e.g., standard, micro, mini, etc.), RS-232 ports and circuitry, proprietary ports and circuitry (e.g., APPLE 30-pin and Lightning ports), RFID antennas and circuitry, NFC antennas and circuitry, bump technology antennas and circuitry, a Bluetooth (e.g., BLE) antenna and circuitry, DOC SIS circuitry, ONT circuitry, and other antennas, ports, and circuitry.

Figure 3:
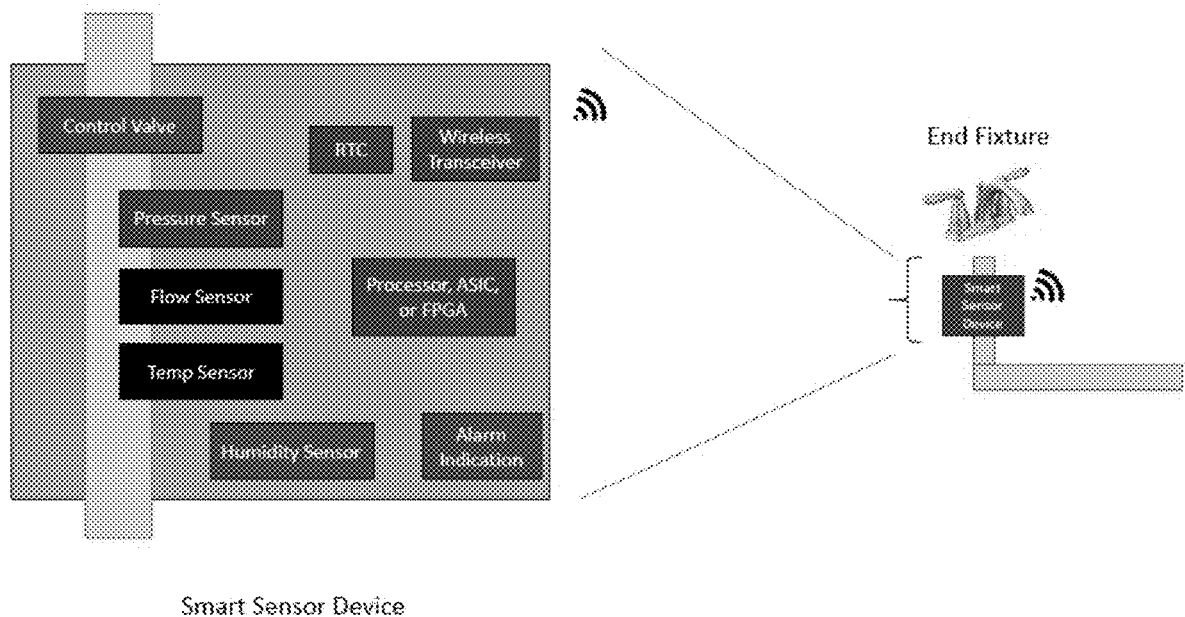

In some embodiments, the smart sensor device also includes other sensors to monitor flow and temperature of the water in addition to pressure. As depicted in FIG. 3, it may also include a humidity sensor to measure humidity at that location. A control valve capable of turning on and off water may also be present, and the extent to which the valve is open or closed may be used to measure flow. The valve may also be controllable by the processor, such that a user could remotely open or close the valve from a mobile device or other device in the building.

In some embodiments, also depicted in FIG. 3, the smart sensor device in includes an audio or visual alarm that can signal the existence of a leak. Exemplary alarms include buzzers, speakers, status LEDs, and LCD displays.

Figure 4:
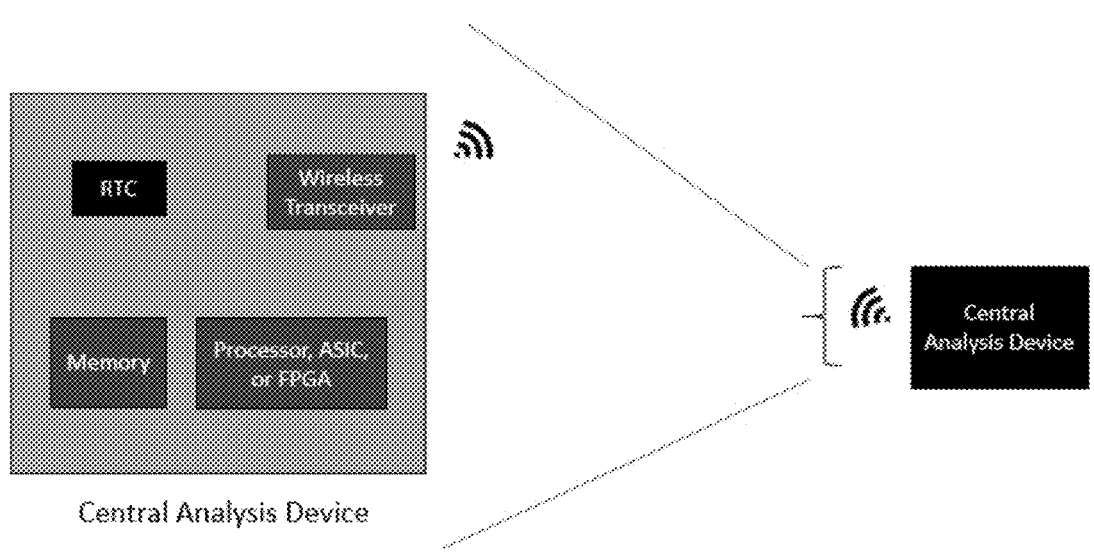
FIG. 4 is a schematic diagram of an exemplary central analysis device

FIG. 4 depicts an exemplary central analysis device. The central analysis device aggregates data from the various smart sensor devices. In some embodiments, the central analysis is device is integrated into a smart sensor device. In such embodiments, the processor of the smart sensor device may also be configured to aggregate and analyze data as explained below. In the case where multiple smart sensor devices are configured to be to be a central analysis device, any suitable method may be used to determine one smart sensor device to act as the master central analysis device for system. For example, in one embodiment, when a new smart sensor device is activated, it may check to see if there is already a central analysis device in the plumbing system and, if not, it will act as the central analysis device for the system. In other embodiments, the smart sensor device with the strongest wireless signal at any given time may act as the central analysis device for the system.

The central analysis device analyzes pressure (or other) sensor data to detect consumption patterns and anomalies like leaks. As described in more detail below, the analysis includes creating patterns and performing pattern matching to determine if a pressure event is known (normal) or unknown (abnormal). If the event is a normal event, then no action needs be taken. If it is an unknown event, like a potential leak, then notification can be sent via an alarm or digital communication as described more fully herein.

The patterns can be stored and compared using a neural network or other technique. For example, alternative techniques may include, but are not limited to, zero rule baseline methods, support vector machines, shallow neural networks, decision trees, recurrent layers, deep neural networks, recurrent layer neural networks, and others. Initial training during product development can establish typical known patterns that can be preloaded in the system. For example, when a new faucet with a smart sensor device is added to a plumbing system, the smart sensor may be pre-programmed with data that is provided to the central analysis device regarding pressure data changes caused use of that or other fixtures. It is contemplated that the exemplary faucet or other smart sensor device may include pressure data for that specific fixture model, data for another model representative of that type of fixture, or may contain data for a number of specific and/or representative models that can be used to update the system data whenever a new device is installed. Such pre-training eases computational loads, gives the system a better initial state, and allows for faster results. Further, after installation, additional training can be performed as the devices are used to further enhance the machine learning's ability to match normal patterns and differentiate from abnormal events.

The pressure sensors can be located throughout the plumbing system. In one embodiment, the leak detection system further includes a digital shutoff valve installed on the main supply line for the plumbing system. The digital shutoff valve may include a transceiver for communicating with the central analysis device, or the central analysis device may be located at the main supply input. The central analysis device may close the shutoff valve at a time when no water user is expected to further test and analyze the plumbing system. For example, the central analysis device may determine a best shutoff time based on stored prior use patterns, or a user may schedule shutoff times using an application connected to the central analysis device via Wi-Fi and/or the Internet. Once the water supply is turned off, a closed volume of water should exist in the plumbing system and the central analysis device can analyze data received from the various sensor device to look for pressure changes. Accordingly, the system may easily be able to determine not only that a leak is occurring, but to determine a specific fixture that may be the source of the leak. Additionally, if no leak is detected, the sensor device data, in both time and frequency domain, during shutoff, can be used to help update stored data patterns used to determine whether a later use event is normal or abnormal as described above.

Comparisons of the time delay of pressure changes throughout the home can be used to help characterize normal or abnormal events. The direction and relative amplitudes of the pressure changes can aid in detection and classification. Also, in embodiments where the pressure at the main line to the residence is known, it can be easier to detect pressure variations originating inside or outside the home based upon time and magnitude differences in measurements.

Figures 30, 31:
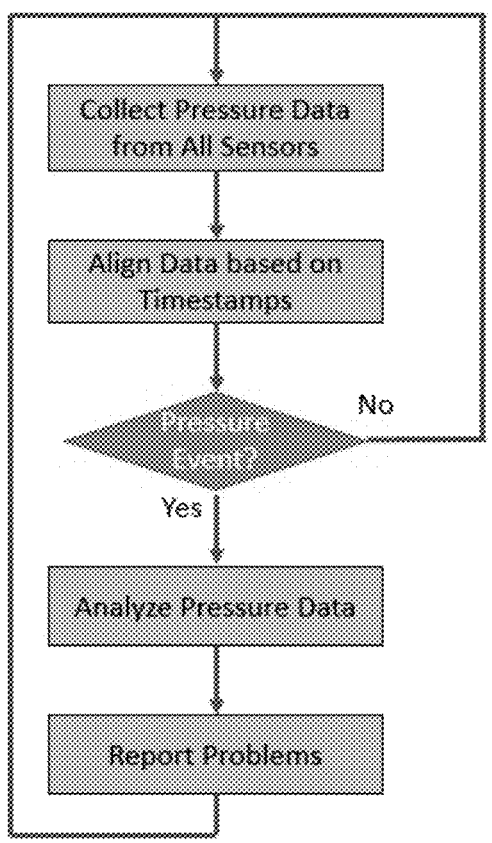
FIG. 30 is a schematic flow diagram showing an exemplary algorithm.
FIG. 31 depicts an example of a pattern associated with a single event.

FIG. 30 illustrates an overview of one exemplary algorithm that would analyze pressure from the low-cost sensors. The central analysis device collects pressure from some or all available pressure sensors in the plumbing system. Exemplary sensors include a sensor at the main shutoff valve for plumbing system, sensors at appliances like a washing machines or dishwashers, and sensors at fixtures such as faucets and toilets. Once received, the central analysis device uses timestamps sent by the sensors with the data to align the data in time so that events can be compared. The data is then reviewed to see if changes in pressure took place to indicate a pressure event. If a pressure event is detected, the event is analyzed. Otherwise, the algorithm continues to collect data and look for an event.

A pressure event, or "observed event," occurs when water starts or stops flowing, as the kinetic energy associated with the movement of water causes variations in pressure. For example, a water hammer effect is commonly observed when water is abruptly stopped. This results in a readily apparent pressure spike. The dips and spikes in pressure can be used to identify pressure events in the plumbing system.

If a pressure event is detected, a leak-detection analysis is performed. To perform the leak-detection analysis, patterns are stored in memory to be used for later comparison. The patterns may be predefined, may be created during use and/or may evolve from predefined templates. Accordingly, the central analysis device can continue to train the data structures to improve pattern recognition and improve detection. Default patterns also help ensure that extensive training is not required and improves the consistency of results. FIG. 31 depicts an example of a pattern associated with a single event. Several types of parameters (e.g., time, amplitude, frequency) can be calculated and then specific metrics used for each for comparison.

Figure 32:
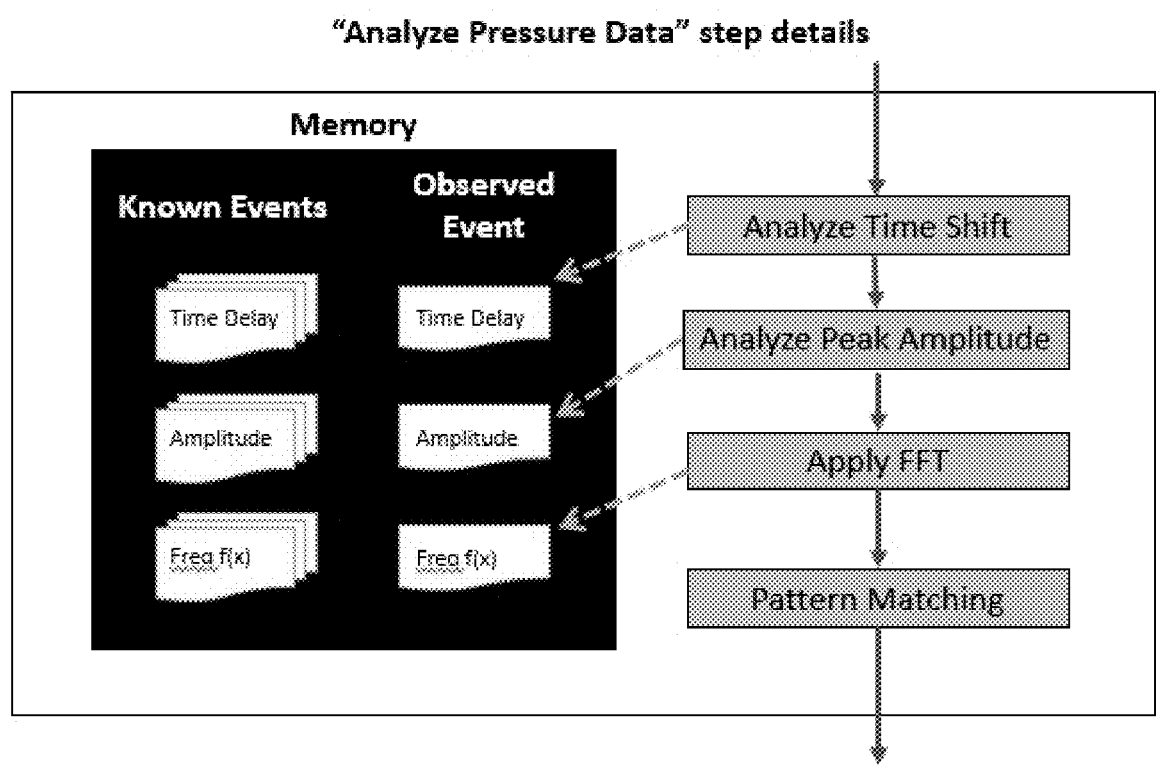
FIG. 32 illustrates an exemplary pressure event analysis.

FIG. 32 illustrates the pressure event analysis in further detail. Data relating to the observed event is stored in memory. Calculations are then performed to create parameters that feed the pattern. As shown in Table 1 and explained more fully below, various time, amplitude, and frequency values can be calculated. Each sensor will have its own values and those values can be combined used independently to create a pattern describing the observed event. Thereafter, the observed event and can be compared to existing patterns using pattern matching as explained herein.

TABLE 1

|  | Time | Amplitude | Frequency | |
| --- | --- | --- | --- | --- |
| Sensor 1 | Duration | Peak to Peak | Dominant Freq | Freq Spectrum |
| Sensor 2 | Duration | Peak to Peak | Dominant Freq | Freq Spectrum |
| Sensor 3 | Duration | Peak to Peak | Dominant Freq | Freq Spectrum |
| Sensor 1 vs 2 | Time Delay | Attenuation | | |
| Sensor 2 vs 3 | Time Delay | Attenuation | | |
| Sensor 1 vs 3 | Time Delay | Attenuation | | |

Table 1 above shows an example of various parameters that can be calculated, and is only illustrative of a large set of possibilities. Some parameters can be unique to a single sensor while others may compare values spanning multiple sensors. The example of Table 1 shows only three sensors, although more or less can be used. Various parameters can be weighted differently to help detect different events. In one embodiment, the parameters can work together as simultaneous inputs feeding an algorithm or data structure. In another embodiment, each pattern (or a subset grouping of patterns) can be used for separate classification networks or algorithms to independently make pattern matches. For example, Table 1 shows 18 parameters. These 18 parameters could each independently match against known event patterns, resulting in 18 separate classifications that could be merged by looking for agreement between the parameters. If all 18 parameters yield patterns representative of an identical known event, then it is clear that the observed event corresponds to that known event.

Addressing exemplary parameters in more detail, time data can be used to help classify an observed event by measuring the duration of an event or a "time shift" of the event. A pressure change will be observed first at the sensor closest to the event. Other sensors will also perceive the change in pressure but after a slight delay. This delay can be used to determine whether the event is normal use event (i.e., turning on faucet) as opposed to a leak. The duration and/or delay pattern is compared to patterns stored in memory that are known to be indicative of a normal use event. If the pattern is recognized, then the event is considered a normal use event and not a leak. The most recent delay pattern may then be added to memory to improve future pattern recognition. If the most recent delay pattern does not match anything in memory, then the system may determine that a leak is occurring, or may move onto further analysis as described below.

Amplitude measurements can also be used. For example, a peak-to-peak amplitude at a single sensor can be measured to determine if that measurement is indicative of normal use of a device at that sensor. Also, or alternatively, the pattern of attenuation in amplitude from one sensor to other sensors can be compared to existing patterns to determine whether an observed event is a normal event or not.

To further classify a pressure event, the data from each smart sensor device can be converted to the frequency domain via a fast Fourier transform (FFT). The processor can compute the FFT and store the result in memory, which allows the data to be analyzed and additional pattern recognition to be applied. Transforming the pressure data into the frequency domain allows the system to more easily discern between low frequency pressure variations caused the water supply of the plumbing system (i.e., the flow into the main line) as opposed to higher frequency variations caused by events internal to the plumbing system. The system can analyze either peak frequencies measured or frequency spectrums to create a pattern that can be used to identify normal and abnormal events. Moreover, different fixtures (e.g. kitchen faucets, toilets, sinks, washing machines, etc.) have unique patterns which can be matched up against to classify pressure events.

In some embodiments, other data such as flow, temperature, humidity, time of day or valve control status may be parameters for the pattern analysis. For example, flow can be sensed explicitly by a sensor or sensed intrinsically by monitoring the position of a control valve if the fixture operation is under digital control. In this way, the control mechanism can act as a flow sensor provided it offers proportional control of the water valve. As another example, humidity sensors can be used to provide humidity data as a parameter. Unlike pressure sensors, humidity sensors need not be placed in line with the flow of the plumbing system, and thus maybe be easier to install throughout a home or building. As a further example, the system may analyze pressure, temperature, humidity or flow data from other days at the same time of day to determine whether the event is normal for a specific time of day (e.g., a typical shower time). The results of these analyses could then be used to notify a user of a leak and/or further train the system for future events.

Figure 33:
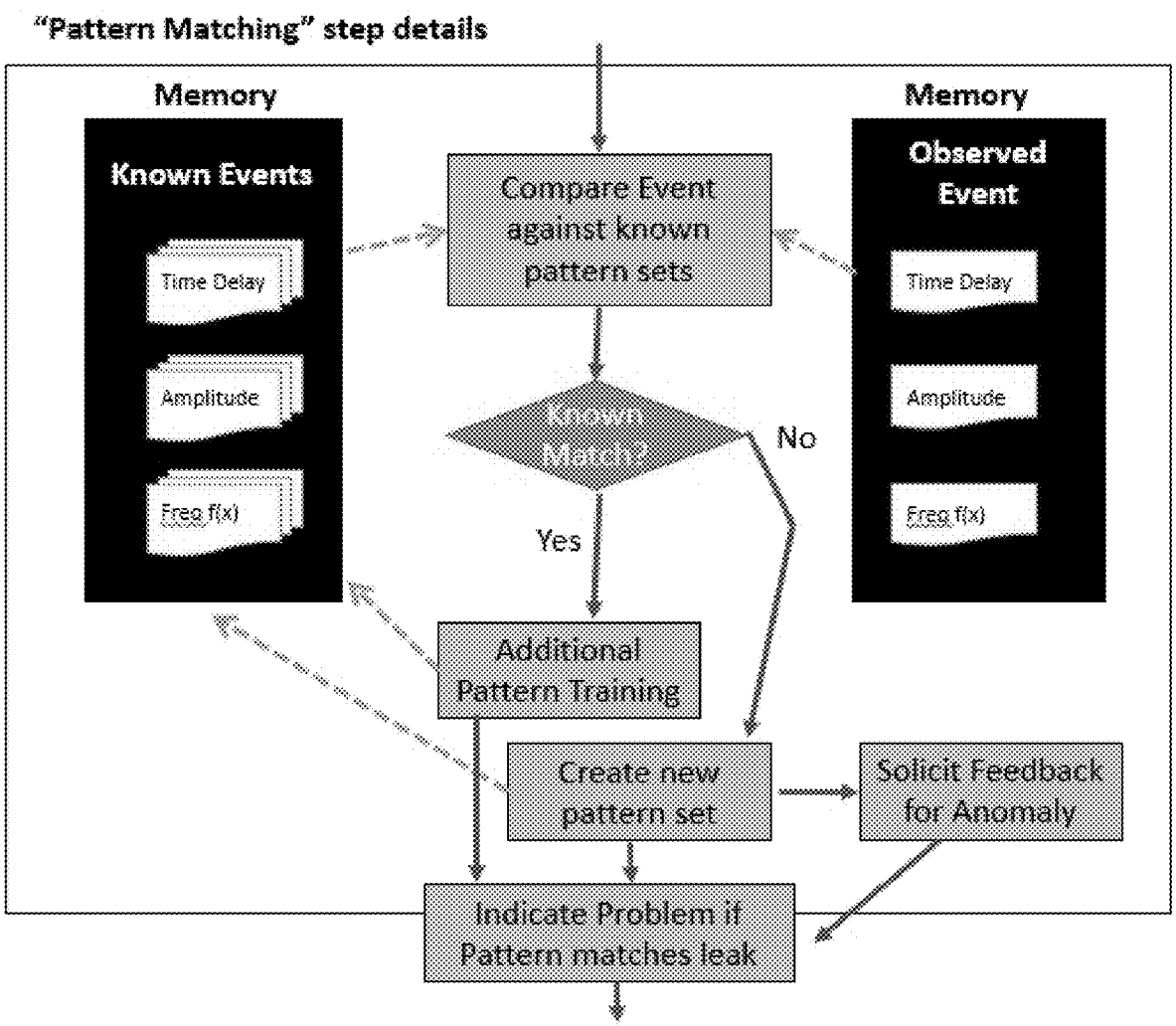
FIG. 33 is a schematic flow diagram showing exemplary pattern matching.

The time, amplitude, frequency and or other parameters described above for an observed event can be compared against patterns stored in memory to determine if an event is normal or abnormal as illustrated in FIG. 33. The parameters associated with an observed event can be compared against parameters associated with known events stored in memory. The patterns can be stored and compared in various ways (e.g. neutral network, tabulated data with tolerances, etc.). If a match is found, the observed event data can optionally be used to perform additional training on the corresponding known event. For example, if that known event corresponds to an undesirable known event pattern (such as a leak), a notification can be created to flag it. If the observed event does not match any of the known event patterns, then a new pattern set can be created. A notification can be created of an anomaly and feedback can optionally be solicited to allow a user to characterize the anomaly. Notification can be sent via the Internet requesting verification that a leak has actually occurred, and providing an option for the user to confirm or deny the presence of a leak. Any feedback from the user can be fed back into the system to further improve known patterns and/or create new patterns. Such notifications may be sent via text, email or push notification, or by triggering an audible or visual alarm.

If an observed event weakly matches a known event pattern, it is possible to create a new known event pattern and to train that new event with the observed event. Accordingly, variations of patterns can be derived from existing events as a starting point, or new patterns can be created using the known event as a starting point based upon the extent of the match.

Thus, exemplary systems comprise a leak detection module with a processor that processes signals from a plurality of low cost sensors installed multiple locations throughout a fluid system, e.g., throughout a house, to determine the presence of a leak in the fluid system.

As disclosed herein, leaks in a plumbing system are detected by low-cost pressure sensors located at fixtures throughout the plumbing system. In some exemplary embodiments, the low-cost pressure sensors comprise a body having at least one fluid connector to place the low-cost pressure sensor in fluid connection with the cold-water fluid path inside the system that is fed by the main water line. Although the examples herein are presented with respect to the cold-water fluid path, the sensors, systems, and methods herein can monitor the hot-water fluid path or both the hot and cold fluid paths to determine leaks and, if appropriate, take action to mitigate the leak. In some exemplary embodiments, the low-cost pressure sensor comprises a diaphragm or plunger (or other suitable moving structure) in fluid communication with the cold-water fluid path that deflects in response to pressure fluctuations in the water in the cold-water fluid path. In some exemplary embodiments, the diaphragm or plunger has an associated biasing member, such as a spring or other flexible member that biases the diaphragm or plunger against the force of the water in the fluid path. In any event, in some embodiments, the low-cost pressure sensor also includes a sensor to detect deflections of the diaphragm or plunger and generate a signal corresponding to the deflection and, therefore, corresponding to the pressure (or a change in pressure) in the cold-water fluid path. This signal is used by the processor in the smart sensor device (or another processor) to determine the presence of a leak using at least the signal or data extracted from the signal. In this sense, the low-cost pressure sensor can be considered to be a leak sensor and the signal can be considered to be a leak sensing signal and the data extracted from the leak sensing signal can be considered to be sensed leak data. The sensor in a respective low-cost pressure sensor is referred to herein as a local leak sensor in electrical or optical communication with the processor and positioned to generate a local leak sensing signal having local sensed leak data imposed thereon, the local sensed leak data indicating a leak in the fluid path. A sensor in other low-cost pressure sensors in the system is referred to herein as a remote leak sensor generating a remote leak sensing signal having remote sensed leak data imposed thereon, the remote sensed leak data indicating a leak in the fluid path. In the broader context of this application, a local sensor is in the same smart sensor device or the same connected product and remote sensors are sensors in other smart sensor devices, other connected products, and the hardwired water sensors. In exemplary embodiments, the processor in the smart sensor device (or another processor) (i.e., the "leak decision-making processor") uses local sensed leak data and remote sensed leak data received from at least one other low-cost pressure sensor to determine the presence of a leak in the cold-water fluid path. The leak decision-making processor is sometimes referred to herein as the "central analysis device."

In some exemplary embodiments, the diaphragm or plunger has a magnetized piece secured to it and the diaphragm or plunger sensor comprises a magnetic sensor, e.g., a Hall effect sensor, that generates the leak sensing signal with the sensed leak data. In other exemplary embodiments, the diaphragm or plunger has water from the cold-water fluid path on one side of the diaphragm and a gas in a closed cavity on the other side of the diaphragm and the diaphragm sensor comprises a gas pressure sensor that measures the pressure of the gas in the closed cavity (or changes therein) to generate the leak sensing signal with the sensed leak data. In other exemplary embodiments, other diaphragm or plunger sensors are used, e.g., MEMs sensors, atmospheric pressure sensors, barometric pressure sensors, gas pressure sensors, etc.

Figure 16:
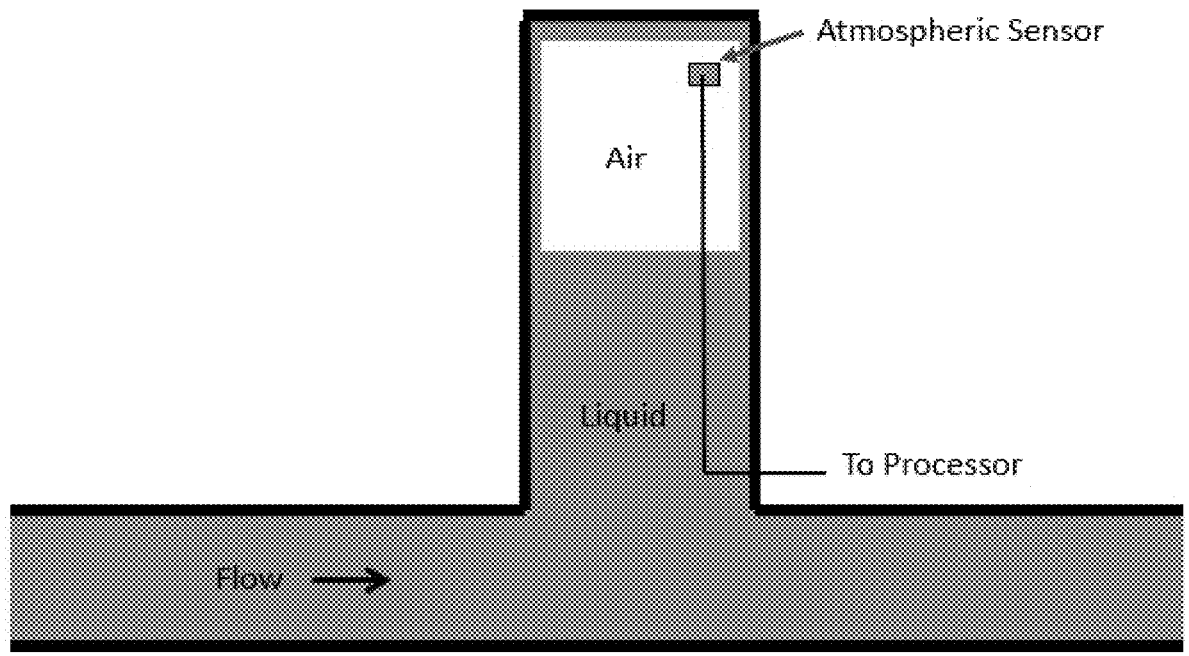
FIGS. 16-18 and 22-25 are schematic diagrams showing exemplary sensors.
Figure 22:
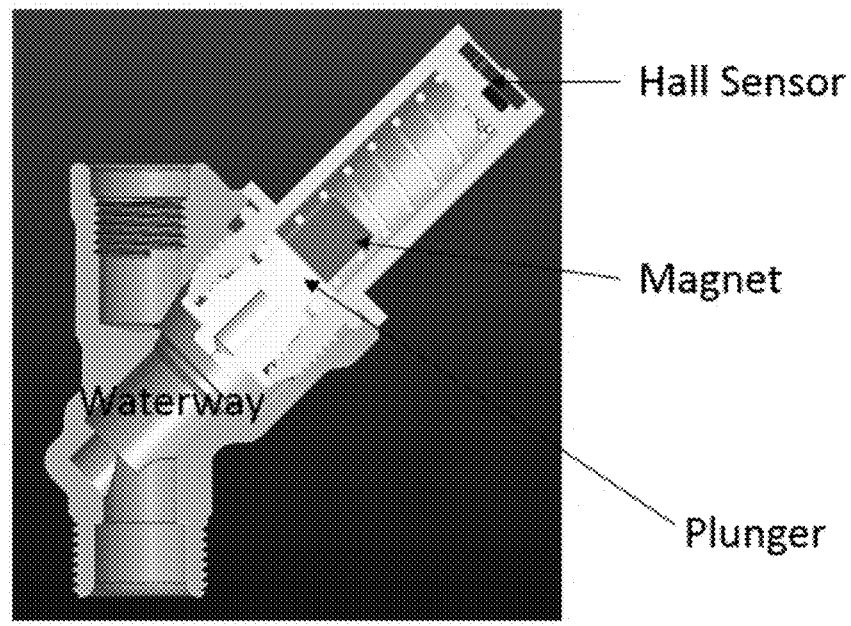

Referring now to FIGS. 16-25, these figures show exemplary low-cost sensor embodiments. Although not shown in these figures, in exemplary embodiments, the sensors include a mechanism for putting the sensor in fluid communication with the cold-water fluid path, e.g., two threaded ends to couple to water pipes or one threaded end to couple to a bore in a fixture body, valve body, or some other body in the fluid path. In some exemplary embodiments, the low-cost sensor comprises a closed chamber with an open end in fluid communication with the cold-water fluid path with gas in the chamber and an atmospheric sensor (e.g., a gas pressure sensor) positioned to sense a parameter of the gas in the chamber (e.g., the gas pressure) or changes therein and in communication with the processor, which has code causing the processor to detect a leak from the atmospheric sensor signal. Changes in water pressure cause changes in atmospheric pressure and this is measured by the atmospheric sensor. FIG. 16 shows a schematic example of such a sensor, where a "T" off of the conduit forms a chamber that has trapped air therein and an atmospheric sensor positioned in the trapped air to measure a parameter thereof (e.g., air pressure). Changes in water pressure cause changes in atmospheric pressure and this is measured by the atmospheric sensor. Structurally, this exemplary embodiment is similar to a water hammer arrestor with an atmospheric pressure sensor (or Hall effect sensor) inside the air chamber. FIG. 22 shows an exemplary implementation of an exemplary embodiment. As shown in that figure, a body forms a vertical waterway and has upper and lower threaded openings. Additionally, a threaded opening is at an angle of about 45 degrees from horizontal. In that opening, a hollow plug is sealably secured thereto. The plug has a distal, threaded end that is open to the waterway closed distally. An O-ring seals the plug into the threaded bore of the body. The plug has a plunger that forms an air space against the closed, distal end and that moves longitudinally in response to changes in water pressure in the waterway. The plunger also has a magnet thereon, which is detected by a Hall effect sensor in the closed, distal end of the plug. Changes in water pressure cause the plunger to move and this movement is sensed by the Hall effect sensor, the signal of which is processed by the processor to detect a leak.

Figure 17:
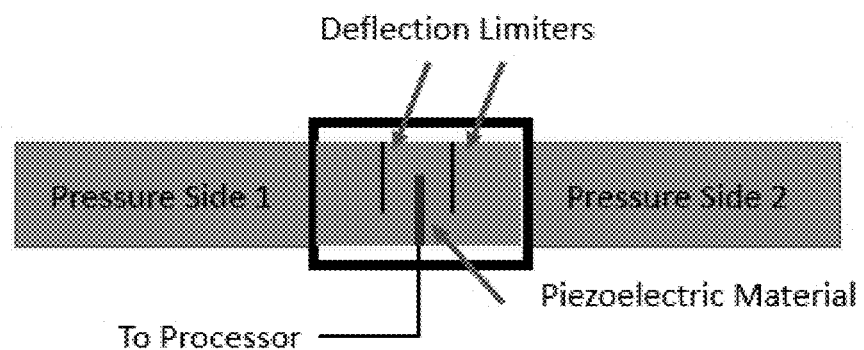

In some exemplary embodiments, the low-cost sensor comprises a lever having an associated deflection sensor in the cold-water fluid path and positioned to sense deflection of the lever in response to movement of the water in the cold-water fluid path and in communication with the processor, which has code causing the processor to detect a leak from the deflection sensor signal. Changes in water pressure cause deflection of the lever, which is measured by the deflection sensor. FIG. 17 shows an example of such a sensor, where a piece of piezoelectric material extends from the side of the conduit (where it is anchored) into the flow of fluid in the cold-water fluid path. As the piezoelectric piece deflects, it generates a corresponding electrical signal that can be input by the processor (e.g., via an ADC) and used by the processor to determine the presence of a leak. Changes in water pressure deflect the piezoelectric piece and the resulting signal is used by the processor to determine the presence of leaks. As shown in FIG. 17, some exemplary embodiments also include one or more deflection limiters proximate the lever to prevent the piezoelectric material (or whatever lever is used) from bending or deflecting too much. An exemplary piezoelectric sensor is the MINISENSE 100 from Measurement Specialties.

Figure 24:
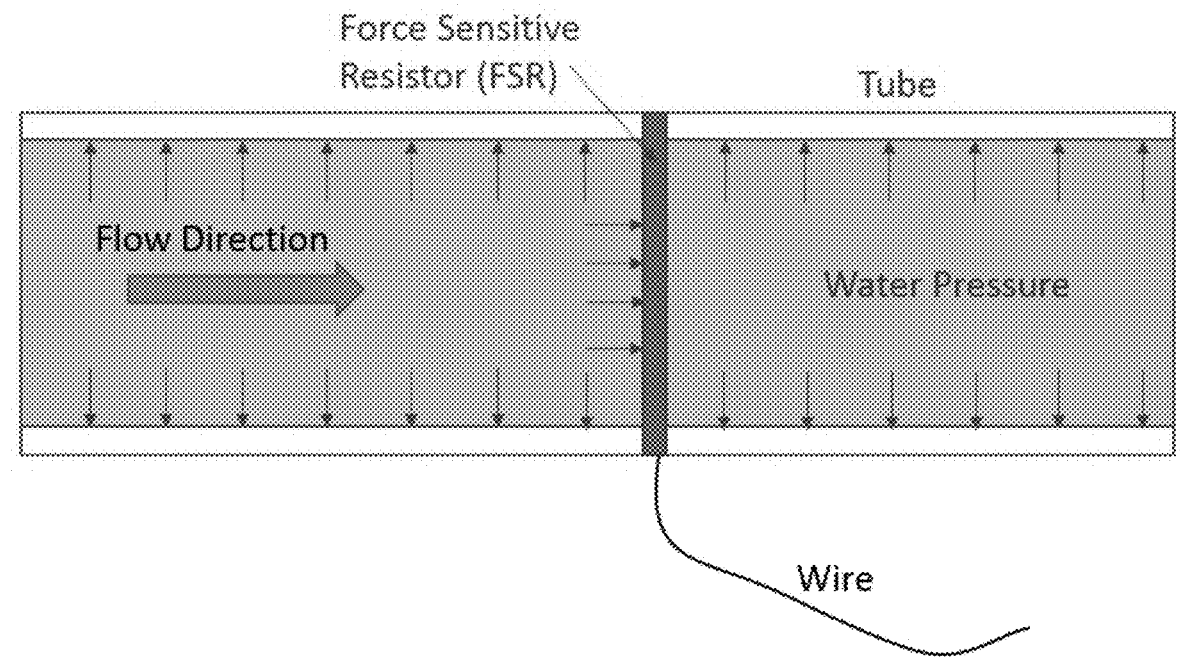

In other exemplary embodiments, a body spans from one side of the conduit to the other (without occluding the conduit) and flexes in response to changes in water pressure. FIG. 24 shows an example of such a sensor, where a length of force sensitive resistor (FSR) material (or another piece of flexible material with a strain gauge thereon) spans from one side of the conduit to the other (it is anchored at both ends) in the flow of fluid in the cold-water fluid path. As the FSR deflects, it generates a corresponding electrical signal that can be input by the processor (e.g., via a voltage source, a bridge, and an ADC) and used by the processor to determine the presence of a leak. Changes in water pressure cause the FSR to bow and the resulting signal is used by the processor to determine the presence of leaks.

Figure 18:
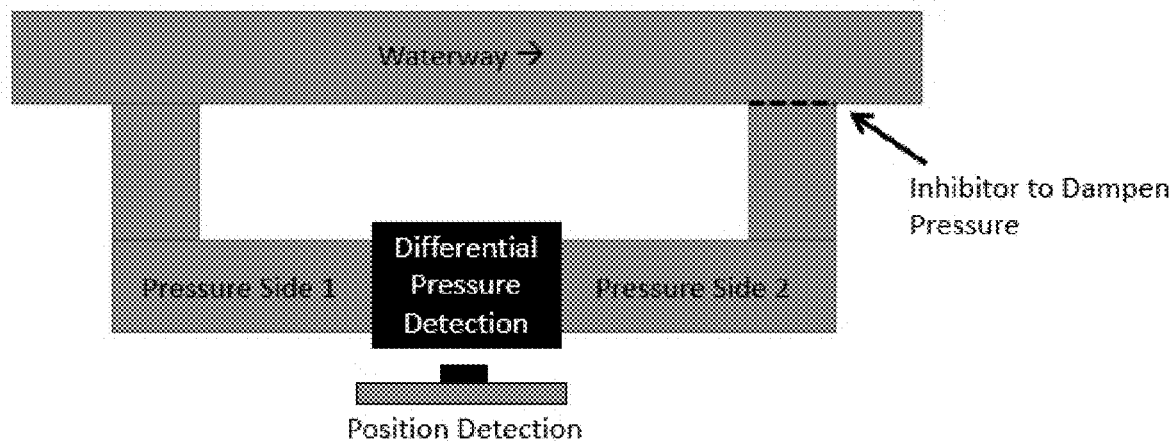

In some exemplary embodiments, the low-cost sensor comprises a differential sensor, e.g., a second fluid path in parallel with the cold-water fluid path and positioned to generate a signal corresponding to differential pressure (changes in pressure) instead of absolute pressure and in communication with the processor, which has code causing the processor to detect a leak from the differential pressure sensor signal. Changes in water pressure cause temporary movement within the second fluid path, which is measured by the differential sensor. FIG. 18 shows an example of such a sensor, where a second fluid path in parallel with the cold-water fluid path has been created. In exemplary embodiments, the differential pressure detection box in FIG. 18 is a pressure balancing element such as a that shown in FIG. 17, which is similar to a pressure balancing valve where the valve moves to balance out pressure differences across it. The position moves in response to pressure changes and a sensor measures the position to determine pressure changes/variations. In exemplary embodiments, the pressure balancing element between the first pressure side and the second pressure side is moved by the pressure wave of a change in pressure and this movement is detected, e.g., by a sensor in communication with the processor, which has code causing the processor to detect a leak from the sensor signal.

Figure 23:
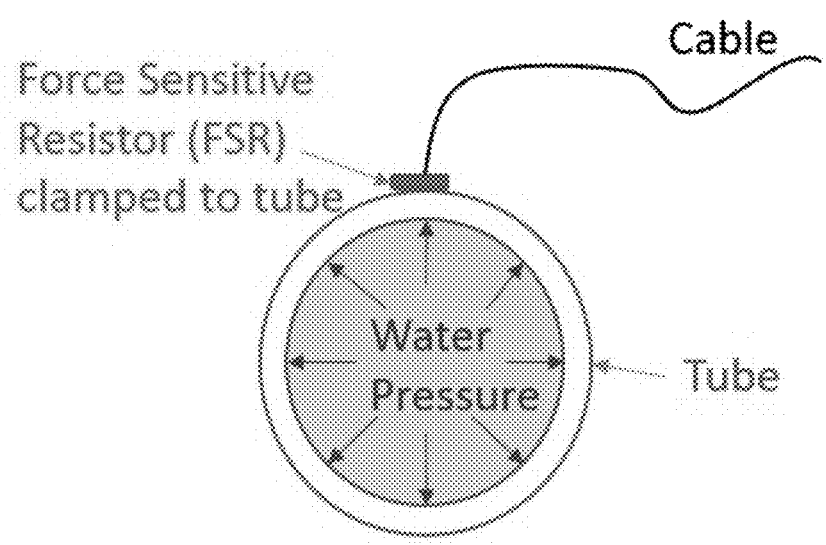

In some exemplary embodiments, the low-cost sensor comprises a strain sensor positioned on a cold-water fluid path water conduit to detect deflections in the water conduit in response to changes in pressure water pressure in the cold-water fluid path and in communication with the processor, which has code causing the processor to detect a leak from the strain sensor signal. Changes in water pressure cause minute changes in the outside of the water pipe, which are measured by the strain sensor. FIG. 23 shows an example of such a sensor, where a force sensitive resistor (FSR) is affixed to the side of the conduit. As the conduit flexes in response to changes in water pressure, the FSR generates a corresponding electrical signal that can be input by the processor (e.g., via an ADC) and used by the processor to determine the presence of a leak. Changes in water pressure deflect the conduit and the resulting signal is used by the processor to determine the presence of leaks.

Figure 25:
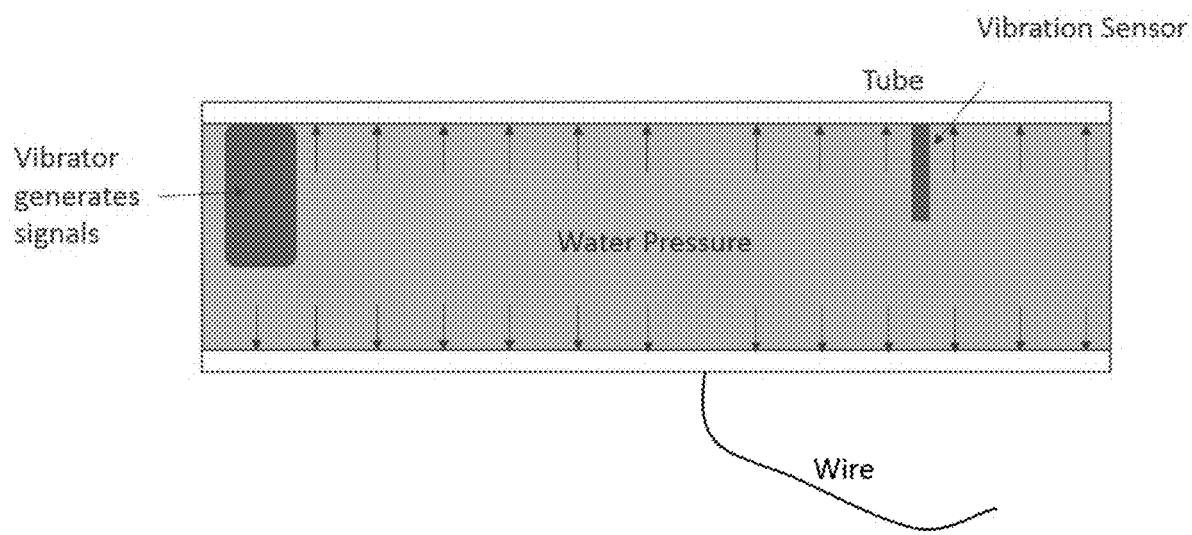

Some exemplary embodiments include an additional source of reference signals (e.g., an acoustic signal generator such as a vibrator), which reference signals are detected by the one or more signals in the system. Different states in the cold-water fluid path cause changes in the signals vis-à-vis a nominal situation, which changes are detected by the one or more signals and which changes are used by the processor to determine the presence of leaks and other events in the system. FIG. 25 shows an example of such a system that detects anomalies in the signal generated by the vibrator and correlates such anomalies with leaks and other events in the cold-water fluid path. In exemplary embodiments, the vibrator is an impulse generator, such as a solenoid valve.

Some exemplary embodiments include one or more connected products. As used herein, a "connected product" in the broadest sense, refers to a plumbing fixture having one or more associated processors that control an electronically controlled valve to control the flow of water out a discharge outlet of the plumbing fixture and also has communications circuitry to communicate with other devices, such as smart sensor devices, other connected products, local servers, cloud servers, the Internet, electronically controlled main shutoff valves, remote sensors, the leak decision-making processor (if the connected product is not functioning in that capacity), a processor determining patterns used to determine a leak (the "model-making processor"), etc. In some exemplary embodiments, one or a plurality of connected products broadcast to the leak decision-making processor and, perhaps, other processors in the system, such as the model-making processor, routine events, such as turning on a flow of water or turning off a flow of water (e.g., with appropriate event timestamps). In exemplary embodiments, the leak decision-making processor then uses at least the event data from the one or more connected products, along with the local and remote sensed leak data (and perhaps other data), to determine the presence of a leak. Additionally, in some exemplary embodiments, the model-making processor uses at least the event data from the one or more connected products, along with the local and remote sensed leak data (and perhaps other data), to determine one or more patterns that can be used by the leak decision-making processor to determine the presence of a leak. For example, an exemplary connected product might transmit (along with a timestamp) event data indicating that it just turned ON, about 0.6 gallons per minute, 50% hot, 50% cold, or just turned OFF, so that the leak decision-making processor and/or the model-making processor can associate pressure/flow changes with that event.

In some exemplary embodiments, the leak decision-making processor has code implementing an algorithm, e.g., a Kalman filter, to analyze the local and remote sensed leak data (and perhaps other data, such as the timestamped event data from one or more connected products) to determine the presence of a leak in the fluid path. In some exemplary embodiments, the decision-making processor is a cloud computer connected to the devices providing leak data and standing water data via local wireless communication circuitry and the internet (in some systems such a cloud computer would be expected to have more processing capability than any of the processors in the connected products and the smart sensor devices). In some exemplary embodiments, the primary decision-making processor is such a cloud computer; however, in the event of a power loss or when Internet communication becomes unavailable, one of the battery-powered processors in the system in communication with some or all of the sensor devices becomes a secondary, temporary decision-making processor and (a) determines the presence of a leak and, if having pre-established permission from the user via user interface, (b) automatically takes corrective action when a leak is detected, e.g., causes the main valve to close and causes connected products to open their valves to bleed pressure and water from the fluid path.

In some exemplary embodiments, the functionality of one of the smart sensor devices described above is integrated into a connected product, e.g., a faucet. In some exemplary embodiments, the local leak sensor is positioned between the cold water main and the control valve, i.e., on the utility side of the valve (instead of between the valve and the discharge outlet), so the system can detect leaks even when the valve is off.

An exemplary electronic plumbing fixture fitting comprises a fixture body including a discharge outlet, the discharge outlet being operable to deliver water via a fluid path; an electronically controlled valve in fluid communication with the fixture body in the fluid path upstream of the discharge outlet; at least one processor programmed to control the electronically controlled valve to selectively control a flow of fluid from the electronically controlled valve out the discharge outlet of the fixture body; and a local leak sensor in electrical or optical communication with the processor, operably connected to the fixture body, and positioned to generate a local leak sensing signal having local sensed leak data imposed thereon, the local sensed leak data indicating a leak in the fluid path; and wherein the at least one processor has code causing the at least one processor to determine the presence of leaks in the fluid path using at least the local sensed leak data; and wherein the at least one processor has code causing the at least one processor to, in response to determining the presence of a leak in the fluid path using at least the local sensed leak data, perform any one of or both of the following: transmit to another processor, using communications circuitry, data indicating the presence of the detected leak in the fluid path; and automatically adjust the electronically controlled valve to adjust the flow of water flowing through the electronically controlled valve.

In exemplary systems, a plurality of such electronic plumbing fixture fittings (e.g., two or three, or more) are used in the same system and aggregated data from the plurality is used to determine a leak. An exemplary electronic plumbing fixture fitting system comprises a plurality of electronic plumbing fixture fittings, each of the plurality of electronic plumbing fixture fittings being in accordance with any of the descriptions herein, each of the plurality of electronic plumbing fixture fittings having associated communications circuitry to communicate with at least one of the others of the plurality of electronic plumbing fixture fittings, and at least one of the plurality of electronic plumbing fixture fittings able to communicate with at least one other processor, the at least one other processor comprising at least one of (a) a central analysis unit and (b) a processor-controlled water main shutoff valve; and wherein each local leak sensor of the plurality of electronic plumbing fixture fittings generates local sensed leak data indicating a leak somewhere in the system fluid path; and wherein the at least processor of the plurality of electronic plumbing fixture fittings has code causing the at least one processor (a) to receive from the others of the plurality of electronic plumbing fixture fittings local sensed leak data indicating a leak somewhere in the system fluid path communicated by the others of the plurality of electronic plumbing fixture fittings and (b) determine using at least its own local sensed leak data and the received local sensed leak data that a leak is present somewhere in the system fluid path and, in response, (c) perform one or any two or more of the following: transmit to another processor, using the communications circuitry, data indicating the presence of the leak somewhere in the system fluid path; and automatically adjust the electronically controlled valve to adjust the flow of water flowing through the electronically controlled valve; and transmit to a processor controlling the processor-controlled water main shutoff valve, using communications circuitry, data indicating the presence of the leak somewhere in the system fluid path; and transmit to the other processors of the others of the plurality of electronic plumbing fixture fittings, using the communications circuitry, data indicating the presence of the leak somewhere in the system fluid path; and transmit to the other processors of the others of the plurality of electronic plumbing fixture fittings, using the communications circuitry, data indicating the presence of the leak somewhere in the system fluid path, and command those other processors to open their respective valves to bleed pressure and water from the fluid path.

Figure 5:
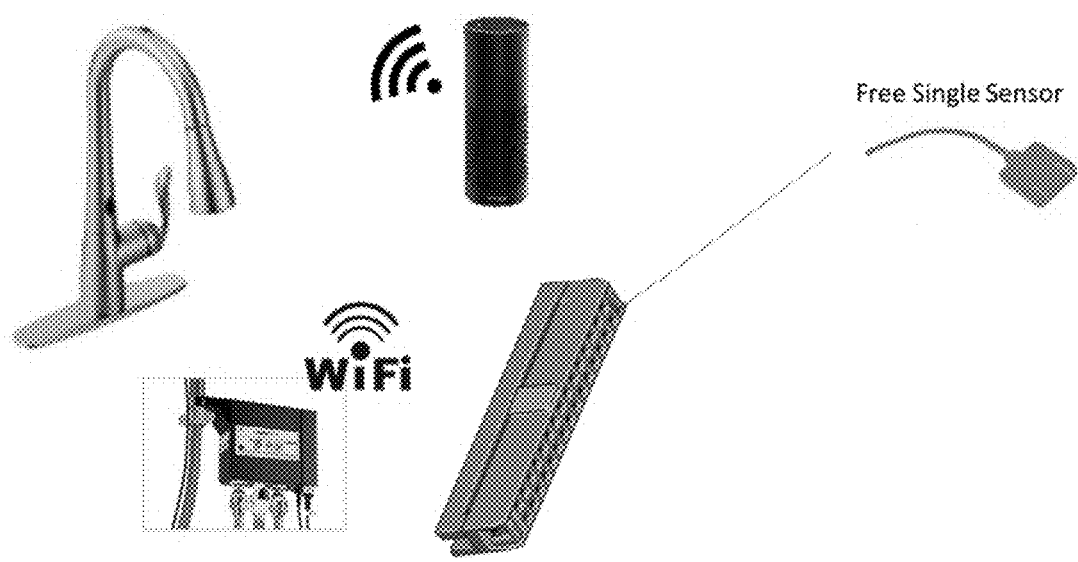
FIGS. 5-6 are schematic diagrams of exemplary systems accepting a plurality of hardwired water sensors
Figure 6:
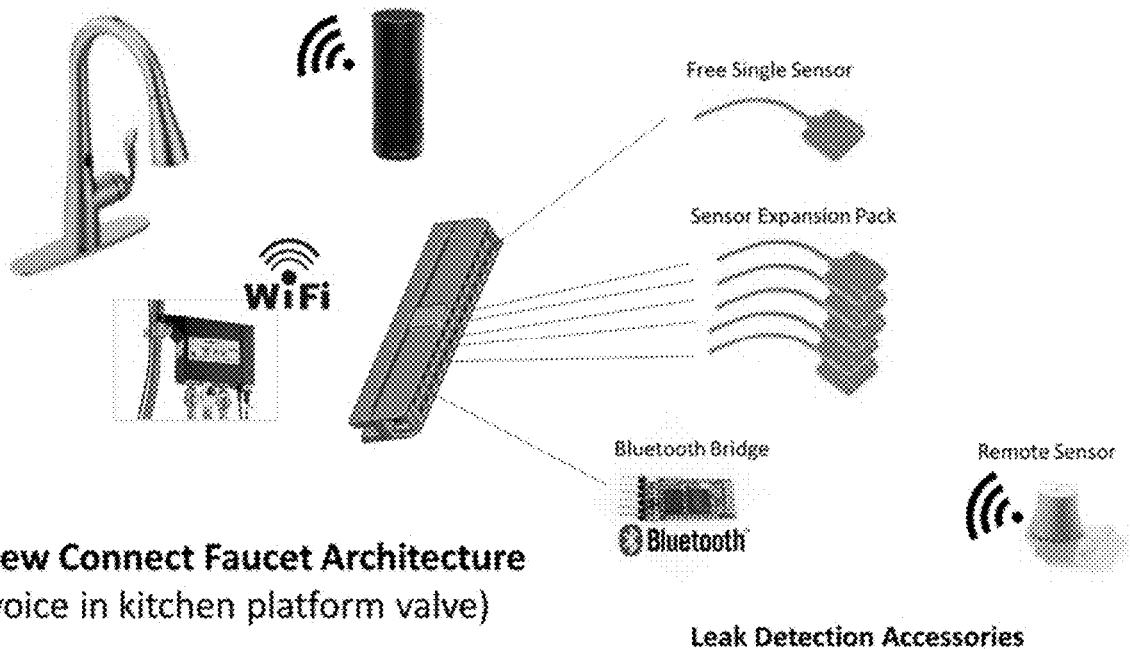
Figure 7:
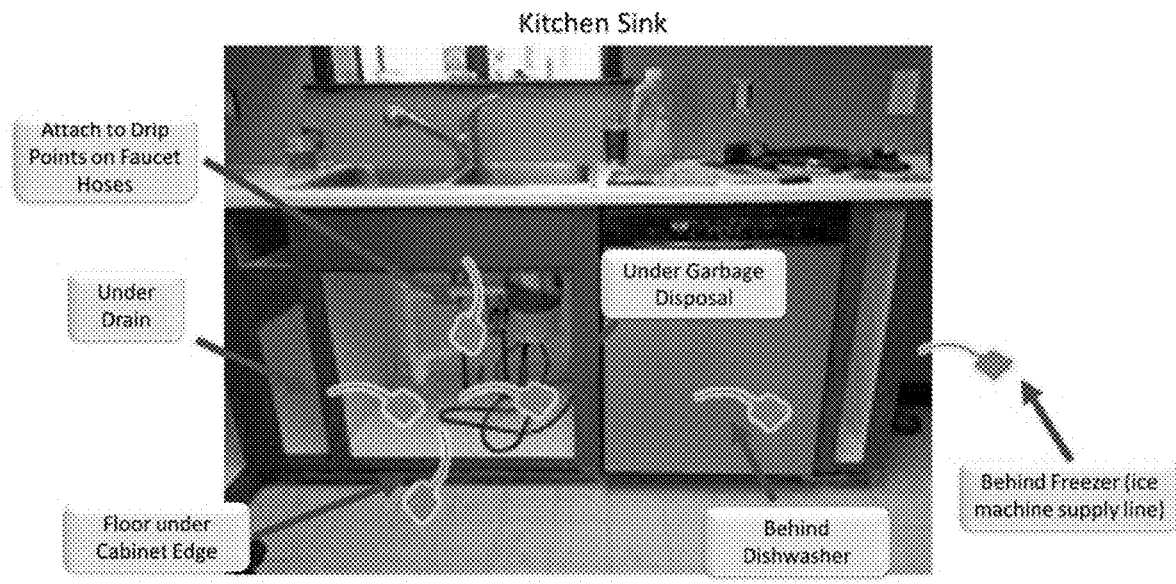
FIGS. 7-9 are schematic diagrams showing exemplary locations for placement of the water sensors.
Figures 8, 9:
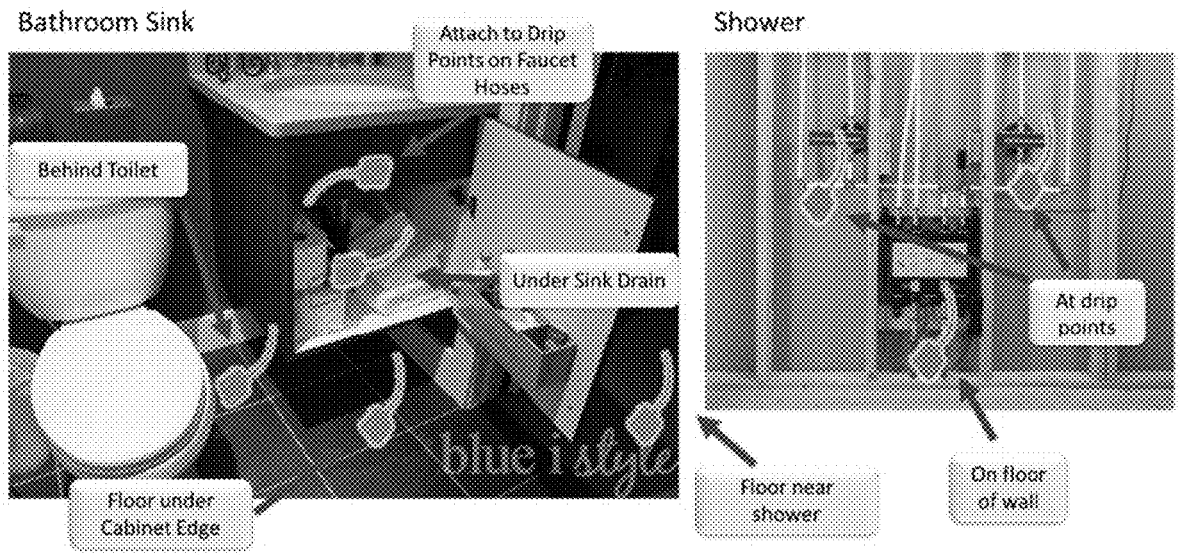

In some exemplary embodiments, connected products include a connector to hardwire one or more water sensors to directly detect water in the vicinity of the connected product. FIG. 5 shows an exemplary system having a connected product with a connector that accepts a plurality of hardwired water sensors. This allows the consumer to expand their system. Exemplary embodiments comprise a kit with a plurality of such water sensors and instructions to position the sensors in locations in the vicinity of the connected product. FIG. 6 shows additional such sensors hardwired to the connected product. FIGS. 7-9 show exemplary locations for placement of the water sensors in the vicinity of the connected product. When any one of the sensors detects standing water, corresponding standing water data is transmitted by the connected product to one or more other processors, as discussed herein. In some exemplary embodiments, the smart sensor devices have connectors to be hardwired to one or more hardwired water sensors and when any one of the sensors detects standing water, corresponding standing water data is transmitted by the respective smart sensor device to one or more other processors, as discussed herein.

Figure 10:
FIG. 10 is a schematic diagram of another exemplary system.
Figure 11:
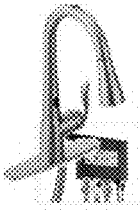
FIG. 11 provides information about the different components in the system of FIG. 10.
Figure 12:
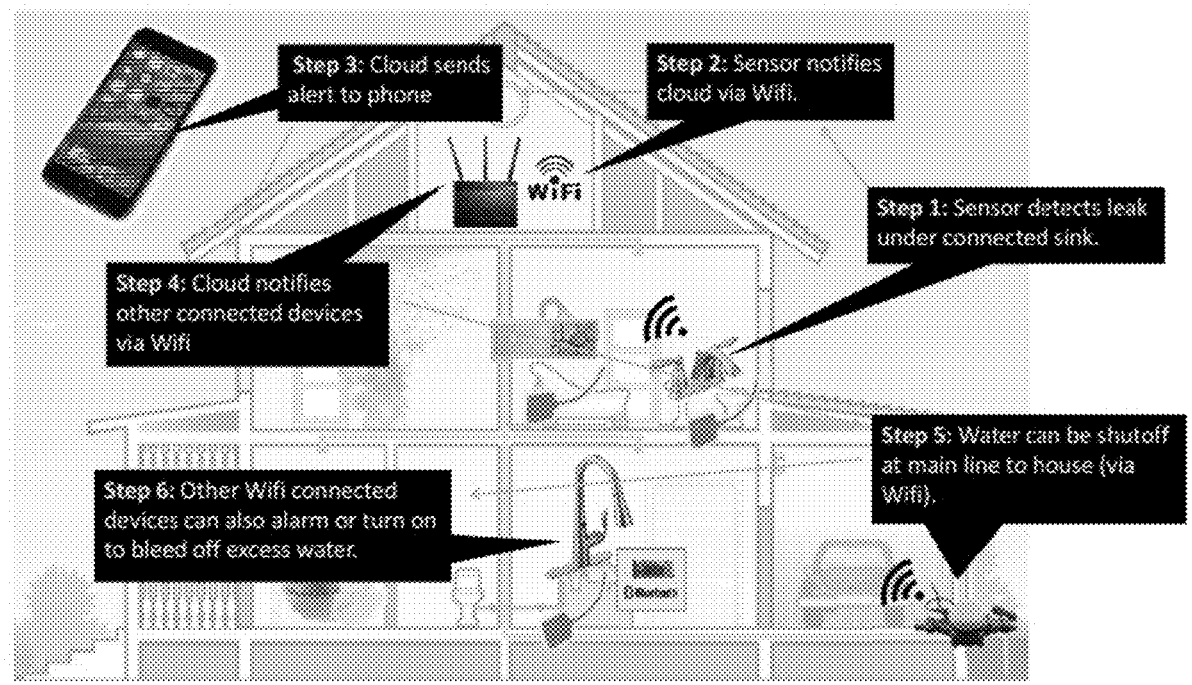
FIGS. 12-14 are schematic diagrams shows exemplary processes for handling leak detection in the context of the system of FIG. 10.
Figure 13:
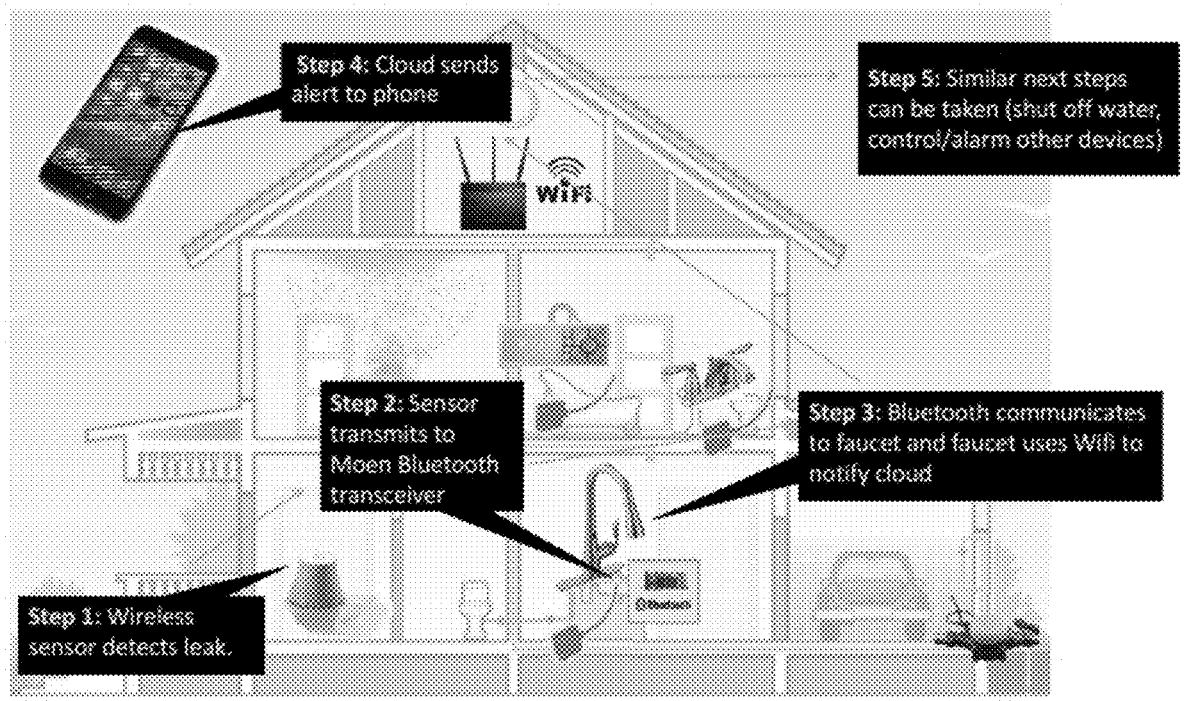
Figure 14:
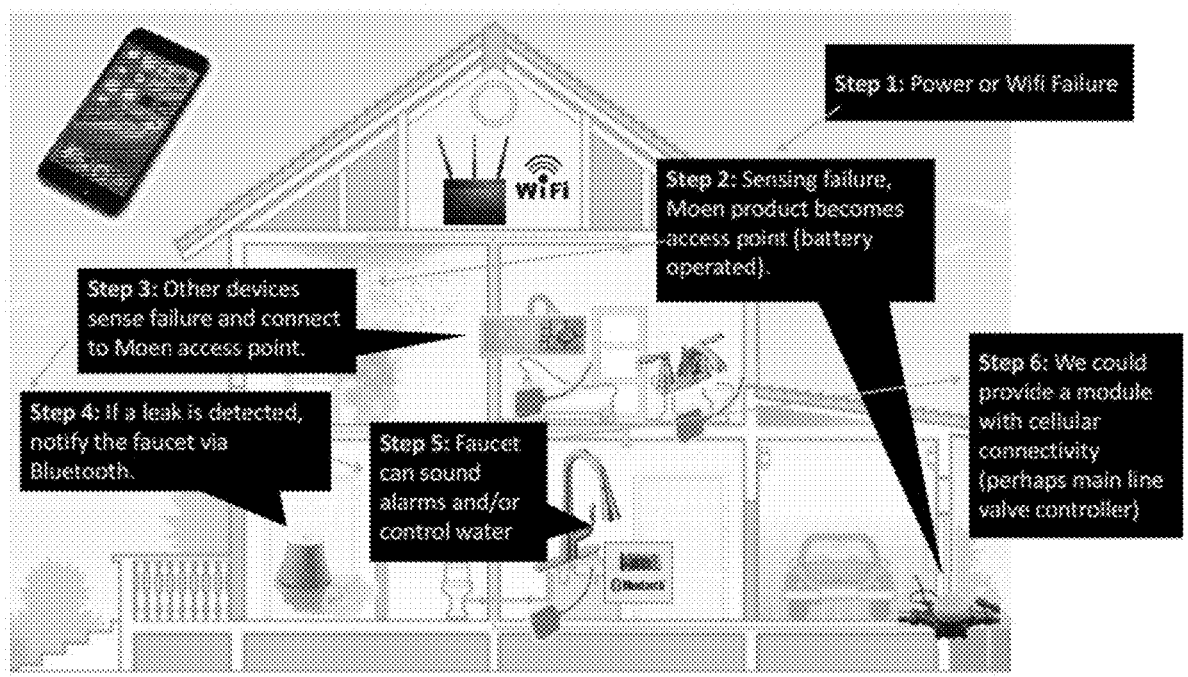

FIG. 10 shows an exemplary system. FIG. 11 provides information about the different components in the system of FIG. 10. FIGS. 12-14 shows exemplary processes for handling leak detection in the context of the system of FIG. 10. Notice that in some exemplary embodiments, some or all of the connected products in the system are caused to turn on to bleed water pressure and bleed water from the fluid path with a detected leak. The pressure in the fluid path might be reduced to the extent that water no longer leaks from the leak. Also, water that flows from a connected product into a sink or tub will not leak out).

In exemplary embodiments, the multiple sensors are hardwired directly to the connected product to minimize overhead costs of wireless connectivity.

Figure 15:
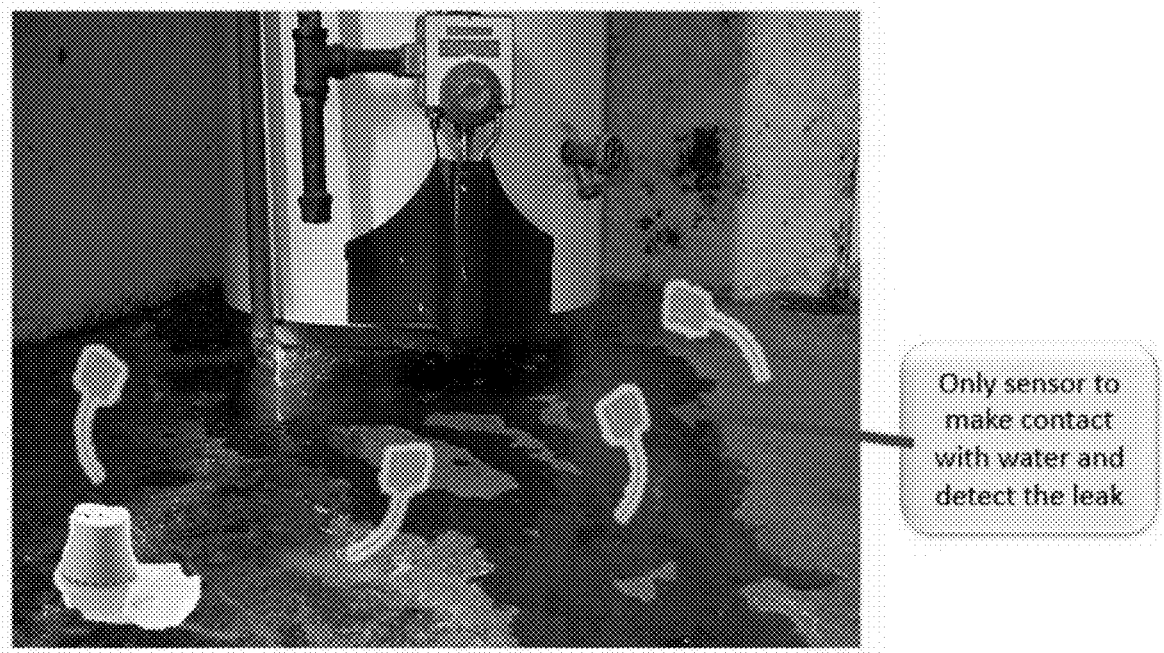
FIG. 15 is a schematic diagram showing an exemplary arrangement of a plurality of wired sensors hardwired to a remote sensor.

FIG. 15 shows an exemplary arrangement of a plurality of wired sensors hardwired to a remote sensor arranged around a water-containing device, such as a water heater. In exemplary embodiments, when the wired sensors detect water, indicating a leak, this event is communicated wirelessly by the remote sensor (e.g., via Wi-Fi or BLE) to one of the other processors (perhaps relayed via a connected product), such as the decision-making processor, a cloud server, and/or one of the connected products for action to be taken, e.g., as shown in FIGS. 12-14.

In some exemplary embodiments, the electronically-controlled main shutoff valve and a single pressure sensor (connected to the decision-making processor, e.g., via wireless communication or as part of a connected product) are used to test for leaks. As with the other exemplary systems having an electronically-controlled main shutoff valve, the electronically-controlled main shutoff valve is installed at main cold supply line. Automatically during a period of non-use, or in response to user input, e.g., via an App, the leak detection system is programmed to shut off the digital shutoff valve at scheduled time(s) when user is not expected to use water in the house. The shutting off the digital valve creates a closed water volume in the house plumbing as most of the fixtures are expected to be off in the house. In exemplary embodiments, this is confirmed using data from connected products. In any event, the pressure sensing element monitors the pressure in the closed water volume for specified amount of time. On the one hand, a constant pressure measurement (e.g., within about 0-1% or within about 0-1% of a predetermined threshold) indicates no leak in the plumbing system. On the other hand, decay in the pressure indicates a leak in the plumbing system (or an open plumbing fixture). In some exemplary embodiments, the system has a predetermined acceptable leak (e.g., a leaky fixture that simply drips into a sink or tub) that defines a predetermined leak threshold (e.g., so many gallons per minute or hour or some other measured parameter) and the constancy or deviation of the measured pressure is compared against this threshold to determine an additional leak in the system, for which action must be taken. In some exemplary embodiments, the user is presented with a user interface, e.g., an icon or a radio button in an App, which indicates that the current system leak parameters may be used as a baseline, even though a leak has been detected (or whether or not a leak has been detected).

In some exemplary embodiments, the gradient of the pressure decay is an indication of type of leak, i.e., a pin hole leak will have a very slow pressure decay while a major leak will have a relatively fast pressure decay. In exemplary embodiments, multiple such tests are done and the results are averaged. In exemplary embodiments, if a leak is detected, decision-making processor sends a message to the consumer, e.g., via SMS or inside the App, and also will send a signal to digital shutoff valve to leave the main shutoff valve closed. In some exemplary embodiments, wired water sensors are hardwired into the system, e.g., proximate a connected product or a remote sensor and positioned in locations as discussed herein, and used in conjunction with the main shutoff valve pressure test. If a remote sensor or any associated wire sensors detect water proximate a connected product or remote sensor, the decision-making processor communicates this to the user, e.g., via SMS or inside the App. The unique ID of the leak detector unit will also indicate the location of the leak in the house and will be used for diagnostic purposes.

Figure 19:
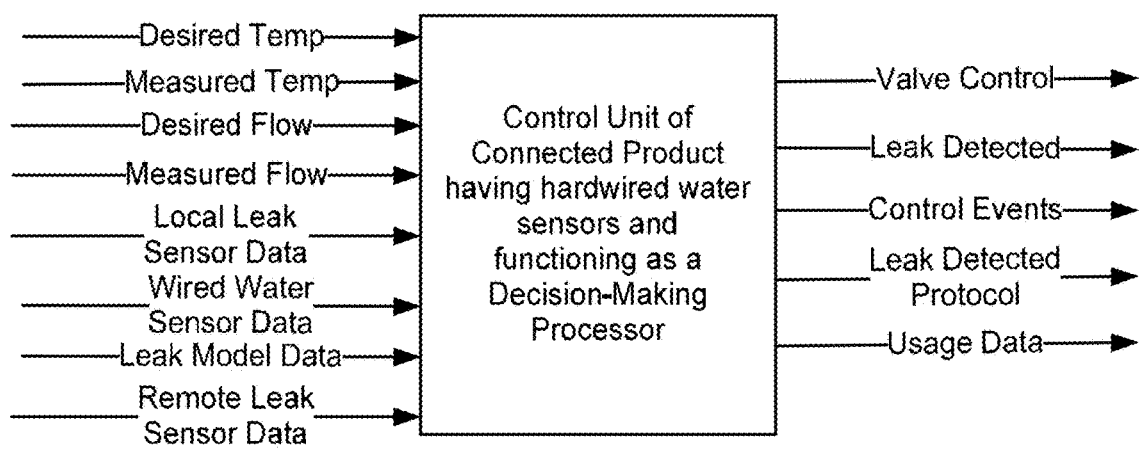
FIGS. 19-20 are schematic diagrams showing exemplary control units.
Figures 20, 21:
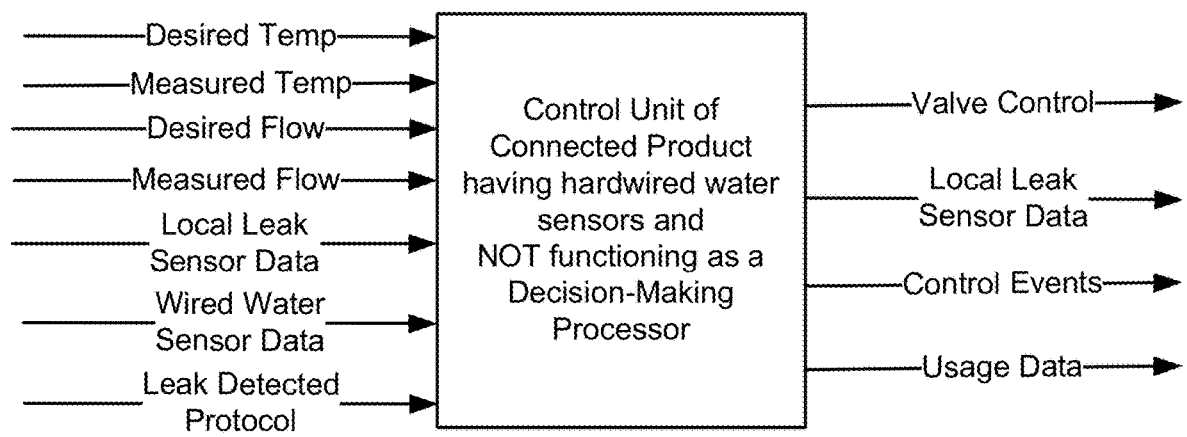
FIG. 21 is intentionally omitted (blank).

Referring now to FIGS. 19-20, various inputs and outputs for exemplary control units are shown. FIG. 19 shows an exemplary control unit of an exemplary connected product having hardwired water sensors and functioning as a decision-making processor. This exemplary control unit accepts as inputs a desired temperature and a measured temperature and, optionally, a desired flow (e.g., a certain percent of the maximum flow) and a measured flow. The desired temperature and the optional desired flow can be entered by a user, e.g., using a user interface, such as one or more switches or non-contact sensors or via an App. Additionally, the control unit accepts as inputs local leak sensor data from its own sensor, remote leak sensor data from other sensors in the system measuring the fluid path, wired water sensor data, and leak model data, as discussed herein. Using this data, as explained herein using any of the various methodologies herein, the control unit determines the presence of a leak (or not). As shown in FIG. 19, this control unit also generates valve control signals to control the hot and cold valves for flow control and temperature control of water being discharged out of its own respective discharge outlet. Additionally, this control unit transmits a leak detected signal to other devices if it has determined that a leak is present, transmits control event data used by other processors in the system (e.g., this fixture just turned ON using certain parameters or just turned OFF), transmits a leak detected protocol signal, which commands other processors in the system to take actions to mitigate a leak, e.g., connected products will turn ON to bleed pressure and water from the system into respective sinks and tubs, and the main shutoff valve will close. Additionally, in exemplary embodiments, the control unit transmits usage data, e.g., to a cloud server for aggregation and display to the user. In response to determining the presence of a leak, in addition to transmitting the leak detected protocol signal, the control unit turns its respective valve ON to bleed pressure and water from the system into its respective sink or tub.

FIG. 20 shows an exemplary control unit of an exemplary connected product having hardwired water sensors but not functioning as a decision-making processor. This exemplary control unit accepts as inputs a desired temperature and a measured temperature and, optionally, a desired flow (e.g., a certain percent of the maximum flow) and a measured flow. The desired temperature and the optional desired flow can be entered by a user, e.g., using a user interface, such as one or more switches or non-contact sensors or via an App. Additionally, the control unit accepts as inputs local leak sensor data from its own sensor, wired water sensor data, and a leak detected protocol signal, as discussed herein. As shown in FIG. 19, this control unit also generates valve control signals to control the hot and cold valves for flow control and temperature control of water being discharged out of its own respective discharge outlet. Additionally, this control unit transmits local leak sensor data from its own local leak sensor and the wired water sensors (if any) and transmits control event data used by other processors in the system (e.g., this fixture just turned ON using certain parameters or just turned OFF). Additionally, in exemplary embodiments, the control unit transmits usage data, e.g., to a cloud server for aggregation and display to the user. In response to receiving a leak detected protocol signal, the control unit turns its respective valve ON to bleed pressure and water from the system into its respective sink or tub.

Figure 26:
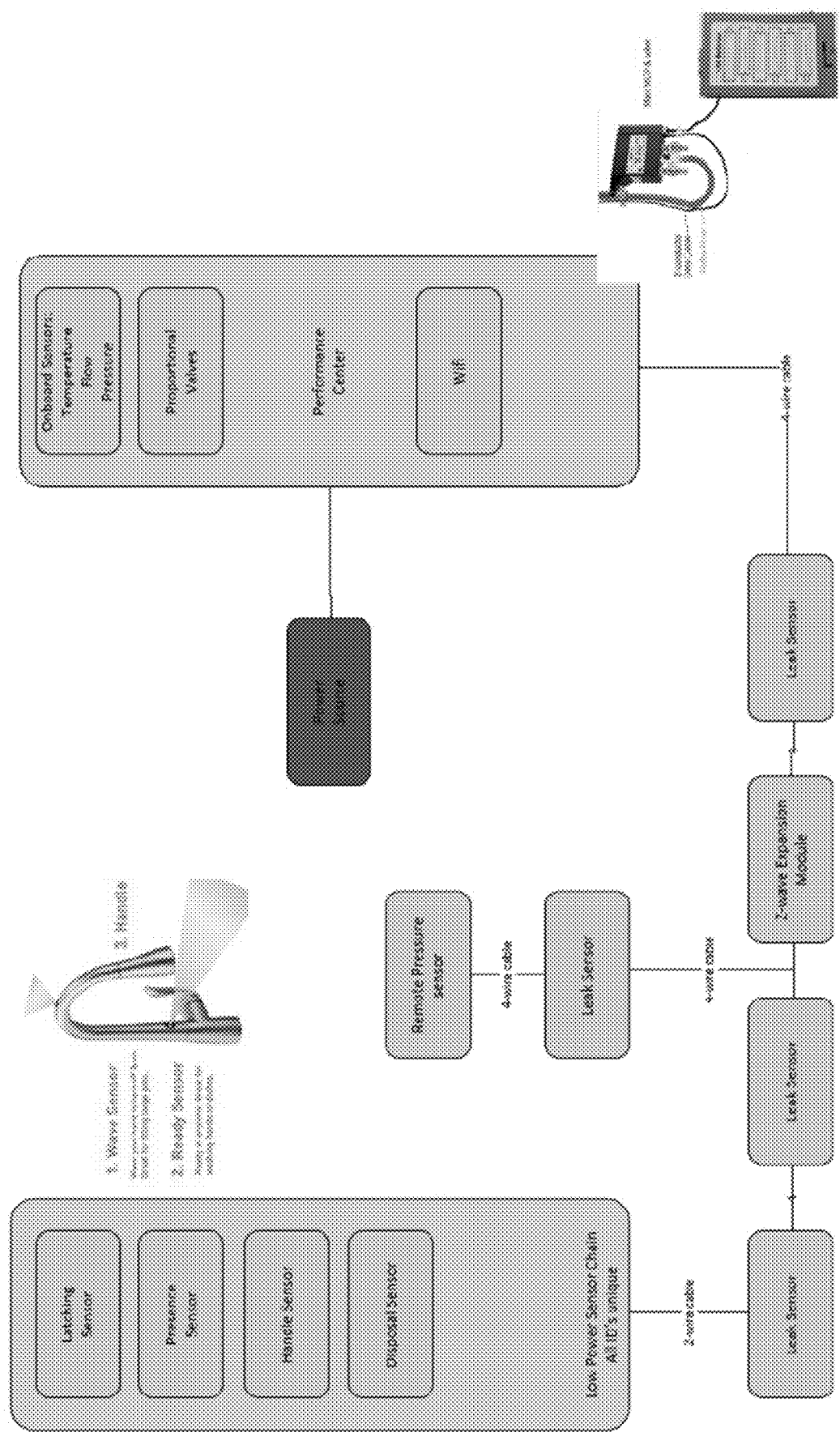
FIG. 26 is a schematic diagram of another exemplary system.

FIG. 26 shows an exemplary system with a plurality of hardwired water sensors, an optional Z-wave expansion module, and an optional smart sensor device connected via a common communications path. In FIG. 26, the upper left-most box represents a portion of the system (the "upper module"; an example of which is shown in the small inset figure) with the plumbing fixture and above the support surface (such as a countertop) and the upper right-most box represents a portion of the system (the "performance center"; an example of which is shown in the small inset figure) below the support surface. In this embodiment, a four-wire cable connects the performance center to a hardwired leak sensor, which is hardwired to the optional Z-wave expansion module, which is connected via a four-wire "T" cable to two hardwired leak sensors. One of the leak sensors is connected to another leak sensor via a four-wire cable, which is connected to the upper module via a two-wire cable. The other hardwired leak sensor off of the optional Z-wave expansion module is connected to the optional smart sensor device. Other exemplary systems consist of the upper module, a plurality of series-connected hardwired water sensors, and the performance center, all connected using straight or T cables. In the examples of FIGS. 26-29, the performance center and the upper module each have a single such connector and the rest of the devices have two such connectors (one in and one out) and this single connector carries power to and data to/from every sensor. In other exemplary embodiments, other configurations are used, e.g., the performance center has 2-10 such connectors and each sensor and the upper module are connected in parallel to the performance center (and each would need only one such connector). In some exemplary embodiments, the performance center has 2-10 such connectors and each sensor and the upper module can be connected either in serial or in parallel to the performance center (and each would have two such connectors), depending on what is more convenient for the user.

Figure 27:
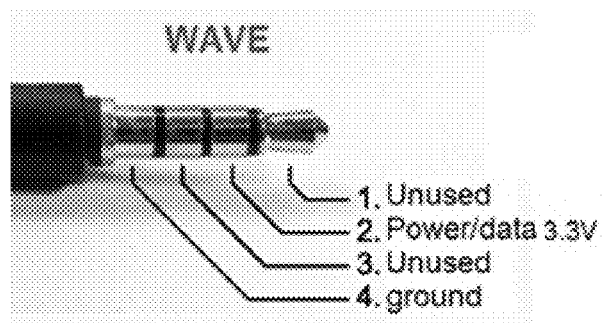
FIG. 27 shows a prior art sensor connector and communication scheme.
Figure 28:
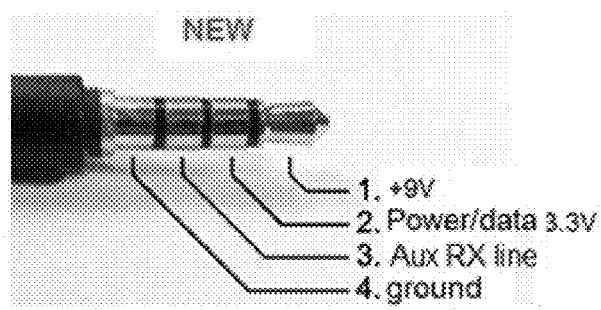
FIG. 28 shows an exemplary sensor connector and communication scheme according to the present application.
Figure 29:
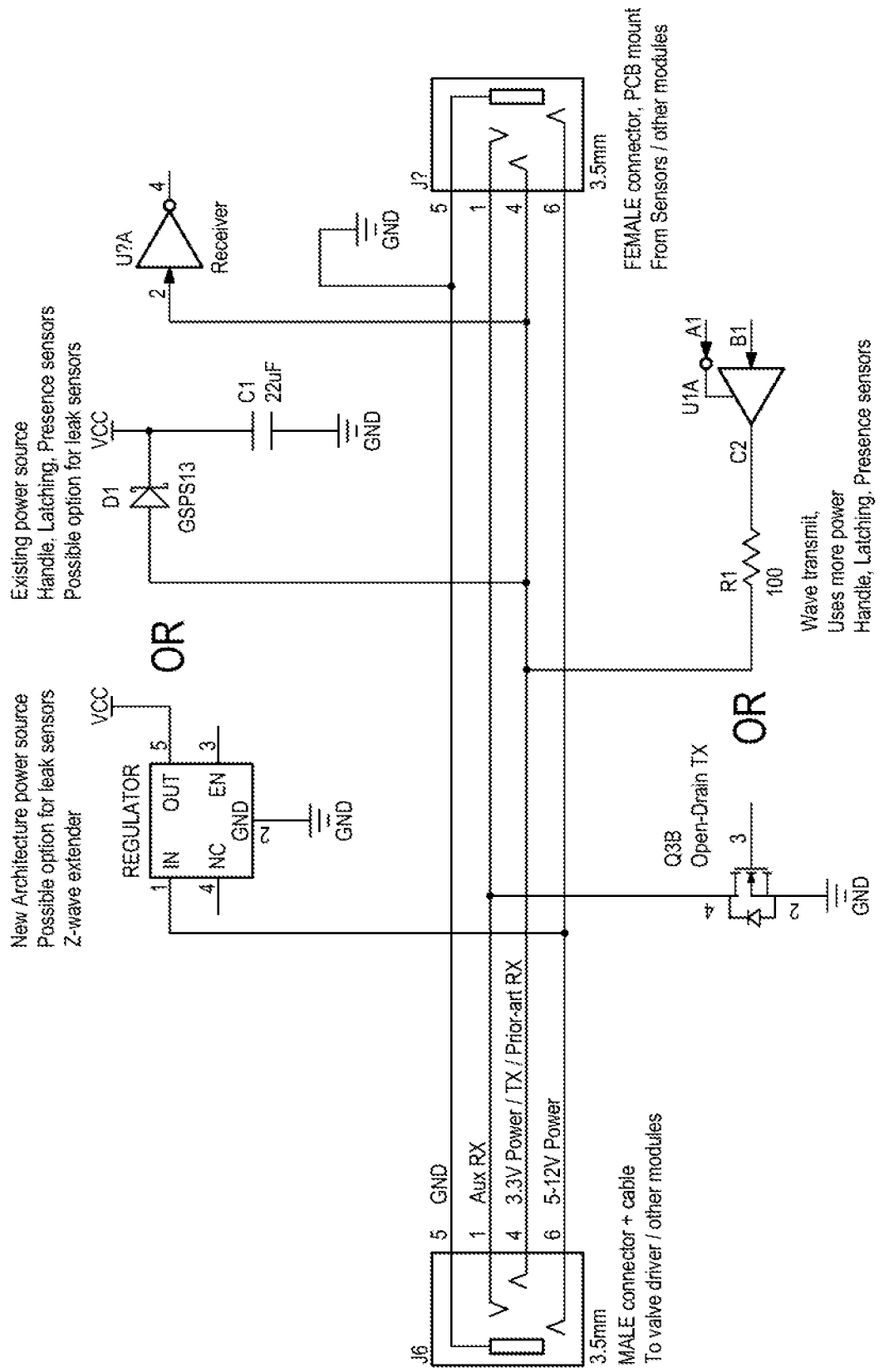
FIG. 29 is a schematic diagram of an exemplary circuit.

FIG. 27 shows a prior art connector and communication scheme. FIGS. 28-29 show an exemplary communication scheme and an exemplary connector that can be used in the systems herein. The communication schemes of FIGS. 28-29 can be used with different connectors. The connector of FIGS. 27-28 can be used with different communication schemes.

In short, in this exemplary system, an additional Rx line and power line has been added to FIG. 27 to create FIG. 28, as explained herein and shown in the figures. Pin 2 and Pin 4 are the same in both FIGS. 27-28: PWR/Data 3.3V and GND. Pin 1 is used in FIG. 28, but not in FIG. 27. In exemplary embodiments, Pin 1 is connected directly to the battery of the performance center and, therefore, will typically be about 9 VDC, i.e., in the range of about 5-12 VDC (FIG. 29). In exemplary embodiments, Pin 4 is the ground, both signal ground and battery ground. In exemplary embodiments, Pin 1 powers the hardwired leak sensors, the optional Z-Wave® expansion module, the optional smart sensor device, and other optional devices, such as an optional audible siren. In exemplary embodiments, "direct battery power access" means the battery voltage between Pin 1 and Pin 4. Pin 1 is unused in FIG. 27. In exemplary embodiments, Pin 2 has multiple functions, and is the same in both FIGS. 27-28 for backwards compatibility, e.g., with the upper module: (a) UART TX (UART for the performance center to communicate with everything in the system), (b) Legacy sensor power, so it must idle high (e.g., 3.3 VDC), and (c) UART RX for Legacy sensors only (uses 20 mA). In short, Pin 2 is the Tx line and is also the Rx line for the older sensors, e.g., the sensors in the upper module. When requested by the performance center to provide data, the old sensors (upper module) respond on Pin 2 and new sensors (hardwired leak detectors, optional smart sensor device, and optional Z-wave expansion module) respond on Pin 3.

As shown in FIG. 29, in some exemplary embodiments, Pin 1 (5-12V Power) provides power for the leak sensors and the optional Z-wave expansion module via a voltage regulator inside respective circuits and housings. As shown in FIG. 29, in addition or in the alternative, in some exemplary embodiments, Pin 2 (3.3V Power/Tx/Legacy Rx) provides power for the hardwired leak sensors and the low-power sensors in the upper module via a diode, such as a Schottky diode, and a capacitor inside respective circuits and housings. As shown at the bottom of FIG. 29, left, in exemplary embodiments, the Tx for the new sensors (hardwired leak detectors, optional smart sensor device, and optional Z-wave expansion module) are in an open-drain configuration on Pin 3 and respond using Pin 3. As shown at the bottom of FIG. 29, right, in exemplary embodiments, the Tx for the old sensors (upper module) use a circuit (e.g., an operational amplifier) to pull Pin 2 to ground to provide data. In some exemplary embodiments, another UART is added to Pin 3 so the leak detectors can communicate with each other directly.

In exemplary embodiments, the optional Z-wave expansion module becomes the hub for the entire system when Wi-Fi goes out, e.g., during a power outage, so leaks can still be detected and mitigative actions still automatically taken by the decision-making processor, even though Wi-Fi and any cloud servers are unavailable.

As described herein, when one or more components are described as being connected, joined, affixed, coupled, attached, or otherwise interconnected, such interconnection may be direct as between the components or may be indirect such as through the use of one or more intermediary components. Also, as described herein, reference to a "member," "component," or "portion" shall not be limited to a single structural member, component, or element but can include an assembly of components, members or elements.

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. Therefore, the inventive concept, in its broader aspects, is not limited to the specific details, the representative apparatus, and illustrative examples shown and described. Accordingly, departures may be made from such details without departing from the spirit or scope of the applicant's general inventive concept.

What is claimed is:

1. A system, comprising:
    a central processor in communication with end user computer devices;
    an electronic plumbing fixture fitting, comprising:
        a fixture body including a discharge outlet, the discharge outlet being operable to deliver water via a water path from a water main or other water source to the discharge outlet;
        an electronically controlled valve in water communication with the fixture body in the water path upstream of the discharge outlet;
        at least one local processor programmed to control the electronically controlled valve to selectively control a flow of water from the electronically controlled valve out the discharge outlet of the fixture body;
        a wireless transceiver in communication with the at least one local processor for wireless communications with the central processor; and
        a local leak sensor in communication with the at least one local processor, operably connected to the fixture body, and positioned to generate a local leak sensing signal having local sensed leak data imposed thereon, the local sensed leak data indicating a leak in the water path; and
    at least one external water sensor in wireless communication with the central processor and characterized by detecting water that has leaked outside the water path and communicating to the central processor the detection of water that has leaked outside the water path; and
    wherein the at least one local processor has code causing the at least one local processor to wirelessly communicate to the central processor at least one of (a) data corresponding to the local sensed leak data and (b) a determination that there is a leak in the water path based on at least the local sensed leak data; and
    wherein the electronic plumbing fixture fitting further comprises at least one electrical or optical connector accepting an external leak sensing signal from the at least one external water sensor, the external leak sensing signal having external sensed leak data indicating the presence of water; and
    wherein the at least one local processor has code causing the at least one local processor to determine the presence of water in the general area of the electronic plumbing fixture fitting using at least the external sensed leak data; and
    wherein the at least one local processor has code causing the at least one local processor to, in response to determining the presence of water using at least the external sensed leak data, perform any one of or both of the following:
        wirelessly transmit to the central processor, using the wireless transceiver, data indicating the presence of water in the general area of the electronic plumbing fixture fitting outside the water path; and
        automatically adjust the electronically controlled valve to adjust the flow of water flowing through the electronically controlled valve.

2. The system according to claim 1, wherein the wireless transceiver of the electronic plumbing fixture fitting comprises a Wi-Fi transceiver.

3. The system according to claim 1, wherein the at least one external water sensor is in communication with the at least one local processor and the at least one local processor communicates to the central processor the detection of water that has leaked outside the water path via the wireless transceiver of the electronic plumbing fixture fitting.

4. The system according to claim 1:
    wherein the at least one local processor has code causing the at least one local processor to determine the presence of leaks in the water path using at least the local sensed leak data; and
    wherein the at least one local processor has code causing the at least one local processor to, in response to determining the presence of a leak in the water path using at least the local sensed leak data, perform any one of or both of the following:
        wirelessly transmit to the central processor, using the wireless transceiver, data indicating the presence of the detected leak in the water path; and
        automatically adjust the electronically controlled valve to adjust the flow of water flowing through the electronically controlled valve.

5. The system according to claim 4, wherein the local leak sensor comprises one of the following:
    a flow sensor operably connected to the fixture body and positioned to generate a local leak sensing signal having local sensed leak data imposed thereon, the local sensed leak data indicative of a leak in the water path;
    a pressure sensor operably connected to the fixture body and positioned to generate a local leak sensing signal having local sensed leak data imposed thereon, the local sensed leak data indicative of a leak in the water path;

a vibration sensor operably connected to the fixture body and positioned to generate a local leak sensing signal having local sensed leak data imposed thereon, the local sensed leak data indicative of a leak in the water path; and one of a resistive sensor and a continuity sensor operably connected to the fixture body and positioned to generate a local leak sensing signal having local sensed leak data imposed thereon, the local sensed leak data indicative of a leak in the water path.

6. The system according to claim 1, wherein the local leak sensor comprises one of the following:

a flow sensor operably connected to the fixture body and positioned to generate a local leak sensing signal having local sensed leak data imposed thereon, the local sensed leak data indicative of a leak in the water path;

a pressure sensor operably connected to the fixture body and positioned to generate a local leak sensing signal having local sensed leak data imposed thereon, the local sensed leak data indicative of a leak in the water path;

a vibration sensor operably connected to the fixture body and positioned to generate a local leak sensing signal having local sensed leak data imposed thereon, the local sensed leak data indicative of a leak in the water path; and one of a resistive sensor and a continuity sensor operably connected to the fixture body and positioned to generate a local leak sensing signal having local sensed leak data imposed thereon, the local sensed leak data indicative of a leak in the water path.

7. The system according to claim 1, wherein the fixture body comprises one of a bathroom faucet body, a kitchen faucet body, a shower body, and a bathtub faucet body.

8. The system according to claim 1, wherein the central processor communicates to an end user computer device one or both of (a) the presence of water in the general area of the electronic plumbing fixture fitting outside the water path and (b) the presence of the detected leak in the water path.

9. The system according to claim 1, further comprising a remotely-controlled water main shutoff valve and wherein the central processor wirelessly communicates with the remotely-controlled water main shutoff valve to cause the remotely-controlled water main shutoff valve to close in response to the detected leak in the water path.

10. The system according to claim 1, further comprising a remotely-controlled water main shutoff valve and wherein the central processor wirelessly communicates with the remotely-controlled water main shutoff valve to cause the remotely-controlled water main shutoff valve to close in response to one or both of (a) the presence of water in the general area of the electronic plumbing fixture fitting outside the water path and (b) the presence of the detected leak in the water path.

11. A system, comprising:

a central processor in communication with end user computer devices;

an electronic plumbing fixture fitting, comprising:

a fixture body including a discharge outlet, the discharge outlet being operable to deliver water via a water path from a water main or other water source to the discharge outlet;

an electronically controlled valve in water communication with the fixture body in the water path upstream of the discharge outlet;

at least one local processor programmed to control the electronically controlled valve to selectively control a flow of water from the electronically controlled valve out the discharge outlet of the fixture body;

a wireless transceiver in communication with the at least one local processor for wireless communications with the central processor; and a local leak sensor in communication with the at least one local processor, operably connected to the fixture body, and positioned to generate a local leak sensing signal having local sensed leak data imposed thereon, the local sensed leak data indicating a leak in the water path; and at least one external water sensor in wireless communication with the central processor and characterized by detecting water that has leaked outside the water path and communicating to the central processor the detection of water that has leaked outside the water path; and wherein the at least one local processor has code causing the at least one local processor to wirelessly communicate to the central processor at least one of (a) data corresponding to the local sensed leak data and (b) a determination that there is a leak in the water path based on at least the local sensed leak data; and wherein the at least one external water sensor comprises a plurality of external water sensors; and wherein the electronic plumbing fixture fitting further comprises a plurality of electrical or optical connectors accepting an external leak sensing signal from each of the plurality of external water sensors, the external leak sensing signals having external sensed leak data indicating the presence of water; and wherein the at least one local processor has code causing the at least one local processor to determine the presence of water in the general area of the electronic plumbing fixture fitting using at least the external sensed leak data; and wherein the at least one local processor has code causing the at least one local processor to, in response to determining the presence of water using at least the external sensed leak data, perform any one of or both of the following:

wirelessly transmit to the central processor, using the wireless transceiver, data indicating the presence of water in the general area of the electronic plumbing fixture fitting outside the water path; and automatically adjust the electronically controlled valve to adjust the flow of water flowing through the electronically controlled valve.

12. The system according to claim 11, wherein the central processor communicates to an end user computer device one or both of (a) the presence of water in the general area of the electronic plumbing fixture fitting outside the water path and (b) the presence of the detected leak in the water path.

13. A system, comprising:

a central processor in communication with end user computer devices;

an electronic plumbing fixture fitting, comprising:

a fixture body including a discharge outlet, the discharge outlet being operable to deliver water via a water path from a water main or other water source to the discharge outlet;

an electronically controlled valve in water communication with the fixture body in the water path upstream of the discharge outlet;

at least one local processor programmed to control the electronically controlled valve to selectively control a flow of water from the electronically controlled valve out the discharge outlet of the fixture body;

a wireless transceiver in communication with the at least one local processor for wireless communications with the central processor; and a local leak sensor in communication with the at least one local processor, operably connected to the fixture body, and positioned to generate a local leak sensing signal having local sensed leak data imposed thereon, the local sensed leak data indicating a leak in the water path; and at least one external water sensor in wireless communication with the central processor and characterized by detecting water that has leaked outside the water path and communicating to the central processor the detection of water that has leaked outside the water path; and wherein the at least one local processor has code causing the at least one local processor to wirelessly communicate to the central processor at least one of (a) data corresponding to the local sensed leak data and (b) a determination that there is a leak in the water path based on at least the local sensed leak data; and wherein the at least one local processor has code causing the at least one local processor to determine the presence of leaks in the water path using at least the local sensed leak data; and wherein the at least one local processor has code causing the at least one local processor to, in response to determining the presence of a leak in the water path using at least the local sensed leak data, perform any one of or both of the following:

wirelessly transmit to the central processor, using the wireless transceiver, data indicating the presence of the detected leak in the water path; and automatically adjust the electronically controlled valve to adjust the flow of water flowing through the electronically controlled valve; and wherein the at least one external water sensor comprises a plurality of external water sensors;

wherein the electronic plumbing fixture fitting further comprises a plurality of electrical or optical connectors accepting an external leak sensing signal from each of the plurality of external water sensors, the external leak sensing signals having external sensed leak data indicating the presence of water; and wherein the at least one local processor has code causing the at least one local processor to determine the presence of water in the general area of the electronic plumbing fixture fitting using at least the external sensed leak data; and wherein the at least one local processor has code causing the at least one local processor to, in response to determining the presence of water using at least the external sensed leak data, perform any one of or both of the following:

wirelessly transmit to the central processor, using the wireless transceiver, data indicating the presence of water in the general area of the electronic plumbing fixture fitting outside the water path; and automatically adjust the electronically controlled valve to adjust the flow of water flowing through the electronically controlled valve.

14. The system according to claim 13, wherein the central processor communicates to an end user computer device one or both of (a) the presence of water in the general area of the electronic plumbing fixture fitting outside the water path and (b) the presence of the detected leak in the water path.

15. A system, comprising:

a central processor in communication with end user computer devices;

an electronic plumbing fixture fitting, comprising:

a fixture body including a discharge outlet, the discharge outlet being operable to deliver water via a water path from a water main or other water source to the discharge outlet;

an electronically controlled valve in water communication with the fixture body in the water path upstream of the discharge outlet;

at least one local processor programmed to control the electronically controlled valve to selectively control a flow of water from the electronically controlled valve out the discharge outlet of the fixture body;

a wireless transceiver in communication with the at least one local processor for wireless communications with the central processor; and a local leak sensor in communication with the at least one local processor, operably connected to the fixture body, and positioned to generate a local leak sensing signal having local sensed leak data imposed thereon, the local sensed leak data indicating a leak in the water path; and at least one external water sensor in wireless communication with the central processor and characterized by detecting water that has leaked outside the water path and communicating to the central processor the detection of water that has leaked outside the water path; and wherein the at least one local processor has code causing the at least one local processor to wirelessly communicate to the central processor at least one of (a) data corresponding to the local sensed leak data and (b) a determination that there is a leak in the water path based on at least the local sensed leak data;

wherein the local leak sensor comprises one of the following:

a flow sensor operably connected to the fixture body and positioned to generate a local leak sensing signal having local sensed leak data imposed thereon, the local sensed leak data indicative of a leak in the water path;

a pressure sensor operably connected to the fixture body and positioned to generate a local leak sensing signal having local sensed leak data imposed thereon, the local sensed leak data indicative of a leak in the water path;

a vibration sensor operably connected to the fixture body and positioned to generate a local leak sensing signal having local sensed leak data imposed thereon, the local sensed leak data indicative of a leak in the water path; and one of a resistive sensor and a continuity sensor operably connected to the fixture body and positioned to generate a local leak sensing signal having local sensed leak data imposed thereon, the local sensed leak data indicative of a leak in the water path; and wherein the at least one external water sensor comprises a plurality of external water sensors; and wherein the electronic plumbing fixture fitting further comprises a plurality of electrical or optical connectors accepting an external leak sensing signal from each of the plurality of external water sensors, the external leak sensing signals having external sensed leak data indicating the presence of water; and wherein the at least one local processor has code causing the at least one local processor to determine the presence of water in the general area of the electronic plumbing fixture fitting using at least the external sensed leak data; and wherein the at least one local processor has code causing the at least one local processor to, in response to determining the presence of water using at least the external sensed leak data, perform any one of or both of the following:

wirelessly transmit to the central processor, using the wireless transceiver, data indicating the presence of water in the general area of the electronic plumbing fixture fitting outside the water path; and automatically adjust the electronically controlled valve to adjust the flow of water flowing through the electronically controlled valve.

16. The system according to claim 15, wherein the central processor communicates to an end user computer device one or both of (a) the presence of water in the general area of the electronic plumbing fixture fitting outside the water path and (b) the presence of the detected leak in the water path.

17. A system, comprising:
a central processor in communication with end user computer devices;
an electronic plumbing fixture fitting, comprising:
a fixture body including a discharge outlet, the discharge outlet being operable to deliver water via a water path from a water main or other water source to the discharge outlet;
an electronically controlled valve in water communication with the fixture body in the water path upstream of the discharge outlet;
at least one local processor programmed to control the electronically controlled valve to selectively control a flow of water from the electronically controlled valve out the discharge outlet of the fixture body;
a wireless transceiver in communication with the at least one local processor for wireless communications with the central processor; and
a local leak sensor in communication with the at least one local processor, operably connected to the fixture body, and positioned to generate a local leak sensing signal having local sensed leak data imposed thereon, the local sensed leak data indicating a leak in the water path; and
at least one external water sensor in wireless communication with the central processor and characterized by detecting water that has leaked outside the water path and communicating to the central processor the detection of water that has leaked outside the water path; and
wherein the at least one local processor has code causing the at least one local processor to wirelessly communicate to the central processor at least one of (a) data corresponding to the local sensed leak data and (b) a determination that there is a leak in the water path based on at least the local sensed leak data; and
wherein the at least one local processor has code causing the at least one local processor to determine the presence of leaks in the water path using at least the local sensed leak data; and
wherein the at least one local processor has code causing the at least one local processor to, in response to determining the presence of a leak in the water path using at least the local sensed leak data, perform any one of or both of the following:

wirelessly transmit to the central processor, using the wireless transceiver, data indicating the presence of the detected leak in the water path;

automatically adjust the electronically controlled valve to adjust the flow of water flowing through the electronically controlled valve; and wherein the local leak sensor comprises one of the following:
a flow sensor operably connected to the fixture body and positioned to generate a local leak sensing signal having local sensed leak data imposed thereon, the local sensed leak data indicative of a leak in the water path;
a pressure sensor operably connected to the fixture body and positioned to generate a local leak sensing signal having local sensed leak data imposed thereon, the local sensed leak data indicative of a leak in the water path;
a vibration sensor operably connected to the fixture body and positioned to generate a local leak sensing signal having local sensed leak data imposed thereon, the local sensed leak data indicative of a leak in the water path; and
one of a resistive sensor and a continuity sensor operably connected to the fixture body and positioned to generate a local leak sensing signal having local sensed leak data imposed thereon, the local sensed leak data indicative of a leak in the water path; and wherein the at least one external water sensor comprises a plurality of external water sensors;
wherein the electronic plumbing fixture fitting further comprises a plurality of electrical or optical connectors accepting an external leak sensing signal from each of the plurality of external water sensors, the external leak sensing signals having external sensed leak data indicating the presence of water; and wherein the at least one local processor has code causing the at least one local processor to determine the presence of water in the general area of the electronic plumbing fixture fitting using at least the external sensed leak data; and wherein the at least one local processor has code causing the at least one local processor to, in response to determining the presence of water using at least the external sensed leak data, perform any one of or both of the following:

wirelessly transmit to the central processor, using the wireless transceiver, data indicating the presence of water in the general area of the electronic plumbing fixture fitting outside the water path; and automatically adjust the electronically controlled valve to adjust the flow of water flowing through the electronically controlled valve.

18. The system according to claim 17, wherein the central processor communicates to an end user computer device one or both of (a) the presence of water in the general area of the electronic plumbing fixture fitting outside the water path and (b) the presence of the detected leak in the water path.

19. The system according to claim 18, further comprising a remotely-controlled water main shutoff valve and wherein the central processor wirelessly communicates with the remotely-controlled water main shutoff valve to cause the remotely-controlled water main shutoff valve to close upon one or both of (a) the presence of water in the general area of the electronic plumbing fixture fitting outside the water path and (b) the presence of the detected leak in the water path.

\* \* \* \* \*